(12) United States Patent
Nam et al.

(10) Patent No.: US 9,031,008 B2
(45) Date of Patent: May 12, 2015

(54) METHODS AND APPARATUS FOR MULTI-USER MIMO TRANSMISSIONS IN WIRELESS COMMUNICATION SYSTEMS

(75) Inventors: Young-Han Nam, Richardson, TX (US); Jianzhong Zhang, Irving, TX (US)

(73) Assignee: Samsung Electronics Co., Ltd., Suwon-Si (KR)

(*) Notice: Subject to any disclaimer, the term of this patent is extended or adjusted under 35 U.S.C. 154(b) by 572 days.

(21) Appl. No.: 12/899,362

(22) Filed: Oct. 6, 2010

(65) Prior Publication Data

US 2011/0103324 A1    May 5, 2011

Related U.S. Application Data

(60) Provisional application No. 61/280,147, filed on Oct. 30, 2009, provisional application No. 61/316,330, filed on Mar. 22, 2010.

(51) Int. Cl.
*H04W 72/04* (2009.01)
*H04K 1/10* (2006.01)
*H04L 5/00* (2006.01)

(52) U.S. Cl.
CPC .......... *H04L 5/0048* (2013.01); *H04W 72/042* (2013.01); *H04L 5/0023* (2013.01); *H04L 5/0091* (2013.01)

(58) Field of Classification Search
CPC .. H04B 7/0452; H04B 7/0413; H04B 7/0608; H04L 5/0048; H04L 5/0023; H04L 5/0053
USPC .......... 370/203, 328–336; 375/260, 267, 340, 375/219, 316; 455/91, 434; 714/748
See application file for complete search history.

(56) References Cited

U.S. PATENT DOCUMENTS 7,929,417 B2    4/2011    Jung et al.
2006/0203711 A1    9/2006    Oh et al.
(Continued)

FOREIGN PATENT DOCUMENTS

CN    101340227 A    1/2009
CN    101431357 A    5/2009
(Continued)

OTHER PUBLICATIONS

3GPP TS 36.211 V8.6.0 "Technical Specification Group Radio Access Network; Evolved Universal Terrestrial Radio Access (E-UTRA); Physical Channels and Modulation" Release 8; Mar. 2009; 84 pages.
(Continued)

*Primary Examiner* — Quang N Nguyen
*Assistant Examiner* — Raji Krishnan

(57) ABSTRACT

A wireless communication system includes a base station capable of communicating with a plurality of subscriber stations. The base station can transmit control information and data to a subscriber stations. The base station also can identify a set of RS patterns to be used to communicate with the subscriber station, assign a subset of antenna port numbers within the set of RS patterns to the subscriber stations. The base station can indicate the assigned states in a Downlink Control Information (DCI) format transmitted in a Physical Downlink Control Channel (PDCCH). The base station transmits the data using a subset of antenna ports corresponding to the subset of antenna port numbers. The base station also can map reference signals corresponding to the subset of antenna ports according to at least one RS pattern within the set of RS patterns.

12 Claims, 17 Drawing Sheets

(56) References Cited

U.S. PATENT DOCUMENTS

| | | | |
|---|---|---|---|
| 2008/0233966 A1 | 9/2008 | Scheim et al. | |
| 2009/0075664 A1 | 3/2009 | Palanki et al. | |
| 2009/0238064 A1 | 9/2009 | Lee et al. | |
| 2010/0034303 A1* | 2/2010 | Damnjanovic et al. | 375/260 |
| 2010/0115358 A1* | 5/2010 | Kotecha et al. | 714/748 |
| 2010/0246712 A1 | 9/2010 | Suo et al. | |
| 2010/0272032 A1* | 10/2010 | Sayana et al. | 370/329 |
| 2010/0303034 A1* | 12/2010 | Chen et al. | 370/329 |
| 2011/0019776 A1* | 1/2011 | Zhang et al. | 375/340 |
| 2011/0035639 A1* | 2/2011 | Earnshaw et al. | 714/748 |
| 2011/0038310 A1* | 2/2011 | Chmiel et al. | 370/328 |
| 2011/0038398 A1 | 2/2011 | Konno et al. | |
| 2011/0064159 A1* | 3/2011 | Ko et al. | 375/267 |
| 2011/0070845 A1* | 3/2011 | Chen et al. | 455/91 |
| 2011/0076962 A1* | 3/2011 | Chen et al. | 455/68 |
| 2011/0116437 A1* | 5/2011 | Chen et al. | 370/312 |
| 2011/0122825 A1* | 5/2011 | Lee et al. | 370/328 |
| 2011/0158351 A1* | 6/2011 | Gorokhov et al. | 375/316 |
| 2011/0194504 A1* | 8/2011 | Gorokhov et al. | 370/329 |
| 2011/0222485 A1* | 9/2011 | Nangia et al. | 370/329 |
| 2011/0274197 A1* | 11/2011 | Zhu et al. | 375/267 |
| 2012/0033540 A1* | 2/2012 | Kim et al. | 370/203 |
| 2012/0057562 A1* | 3/2012 | Kim et al. | 370/329 |
| 2013/0039348 A1* | 2/2013 | Hu et al. | 370/335 |
| 2014/0016717 A1* | 1/2014 | Kim et al. | 375/267 |
| 2014/0105162 A1* | 4/2014 | Li et al. | 370/329 |

FOREIGN PATENT DOCUMENTS

| | | |
|---|---|---|
| RU | 2008 115475 A | 10/2009 |
| WO | WO 2008/044882 A1 | 4/2008 |
| WO | WO 2008/118064 A2 | 10/2008 |
| WO | WO 2008/136750 A2 | 11/2008 |
| WO | WO 2009/036216 A2 | 3/2009 |
| WO | WO 2009/113836 A1 | 9/2009 |
| WO | WO 2009/131142 A1 | 10/2009 |

OTHER PUBLICATIONS

3GPP TS 36.212 V8.6.0 "Technical Specification Group Radio Access Network; Evolved Universal Terrestrial Radio Access (E-UTRA); Multiplexing and channel coding" Release 8; Mar. 2009; 59 pages.

3GPP TS 36.213 V8.6.0 "Technical Specification Group Radio Access Network; Evolved Universal Terrestrial Radio Access (E-UTRA); Physical layer procedures" Release 8; Mar. 2009; 77 pages.

3GPP TS 36.213 V9.0.1 "Technical Specification Group Radio Access Network; Evolved Universal Terrestrial Radio Access (E-UTRA); Physical layer procedures" Release 9; Mar. 2009; 79 pages.

3GPP TSG-RAN WG1 #58bis "Way forward on the details of DCI format 2B for enhanced DL transmission"Oct. 12-16, 2009; 3 pages.

"Further Details on CSI-RS"; R1-100681; Qualcomm, Inc.; 3GPP TSG-RAN WG1 #59bis; Jan. 18-22, 2010; Valencia, Spain; 11 pp.

"Discussion on Layer to DMRS Mapping"; R1-100112; Samsung; 3GPP TSG RAN WG1 #59bis; Jan. 18-22, 2010; Valencia, Spain; 3 pp.

"3rd Generation Partnership Project; Technical Specification Group Radio Access Network; Evolved Universal Terrestrial Radio Access (E-UTRA); Multiplexing and channel coding (Release 9)"; 3GPP TS 36.212 v9.0.0; Dec. 2009; Valbonne, France; 61 pp.

"3rd Generation Partnership Project; Technical Specification Group Radio Access Network; Evolved Universal Terrestrial Radio Access (E-UTRA); Physical layer procedures (Release 9)"; 3GPP TS 36.213 v9.0.1; Dec. 2009; Valbonne, France; 79 pp.

3GPP TSG RAN WG1 #58bis "Control Signaling for LTE Rel-9 Enhanced DL Transmission"; R1-093955; Motorola; Miyazaki, Japan; Oct. 12-16, 2009; 5 pages.

Translated Text of First Chinese Office Action dated Jan. 23, 2014 in connection with Chinese Patent Application 2010800492063; 16 pages.

Translated Russian Decision on Grant dated Sep. 1, 2014 in connection with Russian Patent Application No. 2012117809/07(026887), 29 pages.

3GPP TS 36.212 V8.7.0 "Multiplexing and channel coding"; Release 8; May 2009; 3 pages.

S. Ahmadi; "An overview of next-generation mobile WiMAX technology"; Intel Corporation; IEEE Communications Magazine, vol. 47, No. 6; Jun. 2009; 15 pages.

M. Jiang, et al.; "Multiuser MIMO-OFDM for Next-Generation Wireless Systems" Proceedings of the IEEE, vol. 95. No. 7; 3 pages.

3GPP TS 36.212 V8.7.0; Evolved Universal Terrestrial Radio Access (E-UTRA); Multiplexing and channel coding; Release 8; May 2009; 3 pages.

\* cited by examiner

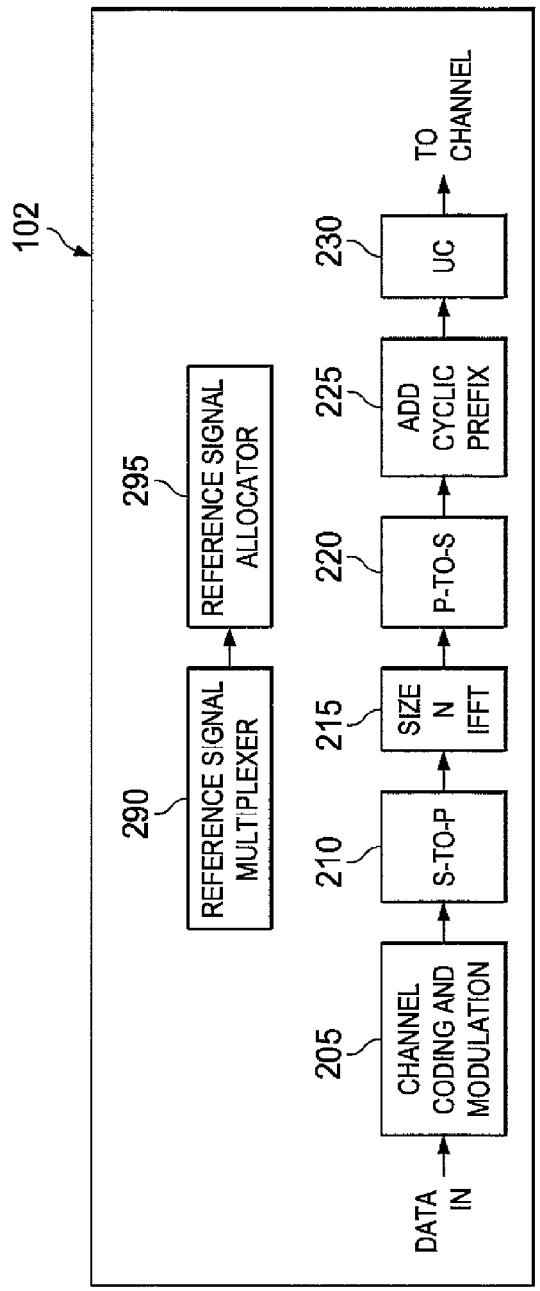
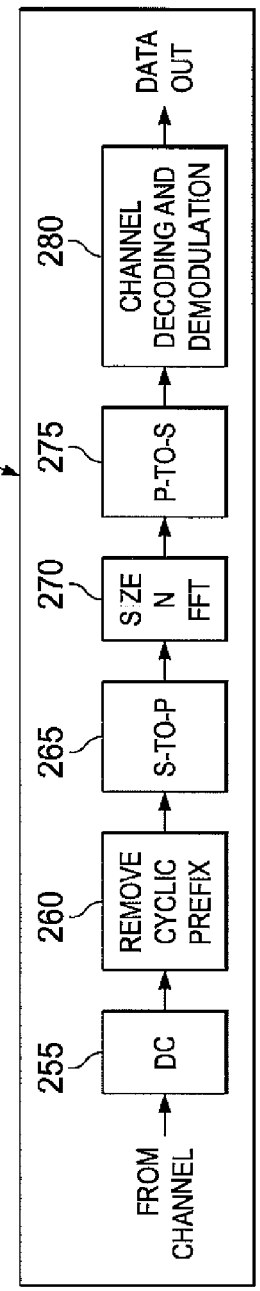
FIG. 2A
FIG. 2B

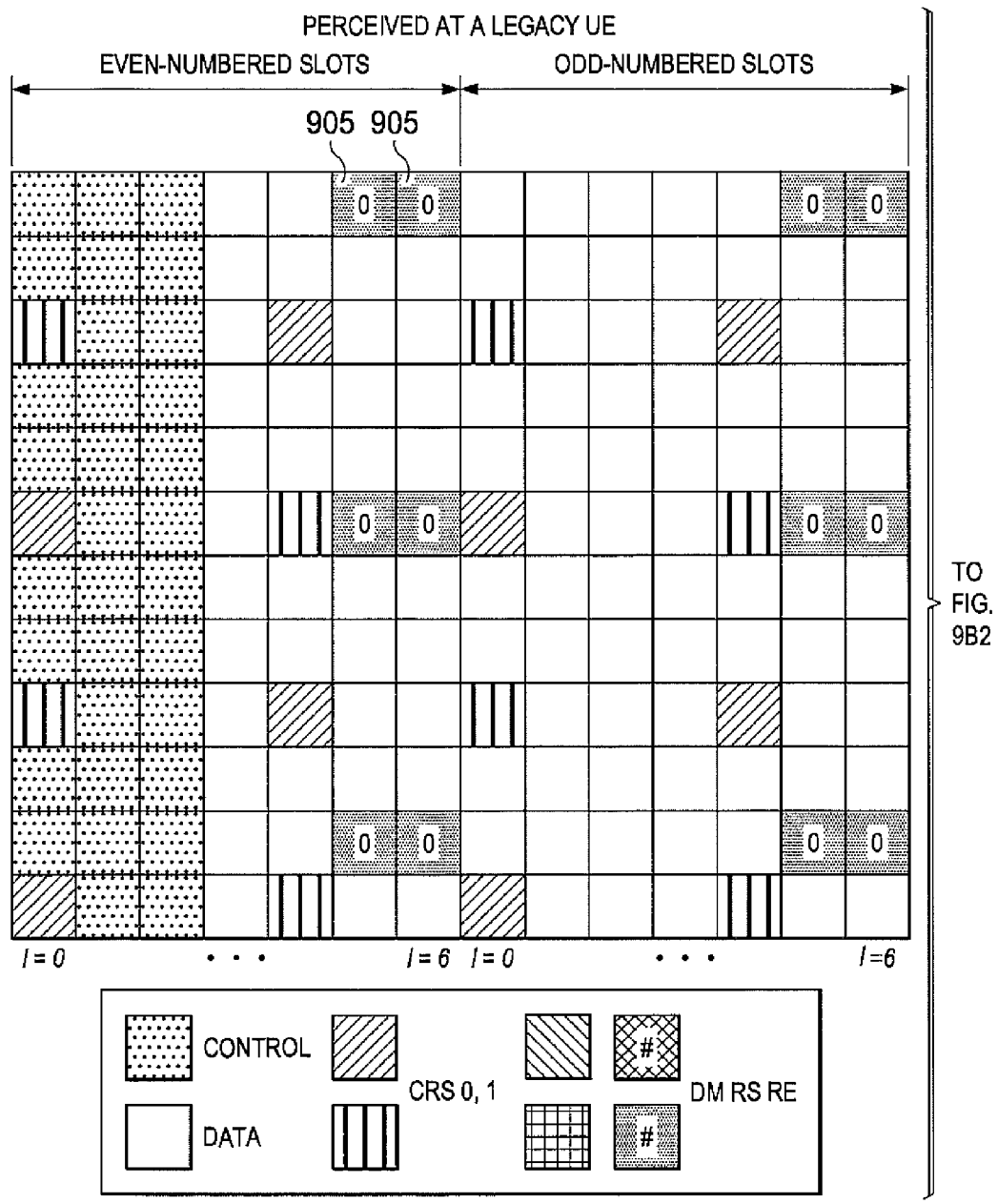
FIG. 9B1

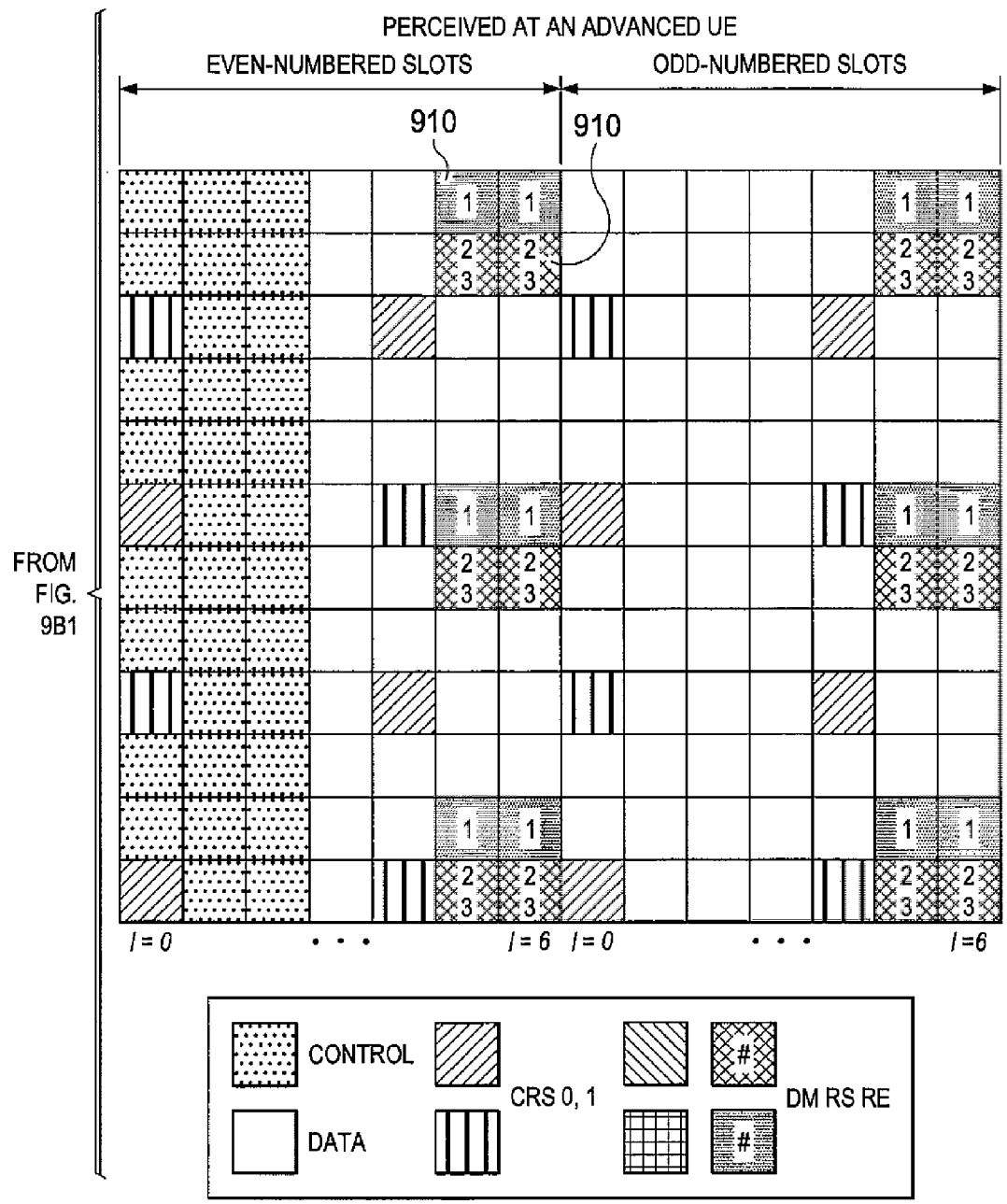
FIG. 9B2

METHODS AND APPARATUS FOR MULTI-USER MIMO TRANSMISSIONS IN WIRELESS COMMUNICATION SYSTEMS

CROSS-REFERENCE TO RELATED APPLICATION(S) AND CLAIM OF PRIORITY

The present application is related to U.S. Provisional Patent Application No. 61/280,147, filed Oct. 30, 2009, entitled "METHODS AND APPARATUS FOR MULTI-USER MIMO TRANSMISSIONS IN WIRELESS COMMUNICATION SYSTEMS" and U.S. Provisional Patent Application No. 61/316,330, filed Mar. 22, 2010, entitled "METHODS AND APPARATUS FOR MULTI-USER MIMO TRANSMISSIONS IN WIRELESS COMMUNICATION SYSTEMS." Provisional Patent Application Nos. 61/280,147 and 61/316,330 are assigned to the assignee of the present application and is hereby incorporated by reference into the present application as if fully set forth herein. The present application hereby claims priority under 35 U.S.C. §119(e) to U.S. Provisional Patent Application Nos. 61/280,147 and 61/316,330.

TECHNICAL FIELD

The present application relates generally to wireless communications and, more specifically, to a system and method for transmitting downlink reference signals in a multi-user multiple input multiple output system.

BACKGROUND

Modern communications demand higher data rates and performance. Multiple-input multiple-output (MIMO) antenna systems, also known as multiple-element antenna (MEA) systems, achieve greater spectral efficiency for allocated radio frequency (RF) channel bandwidths by utilizing space or antenna diversity at both the transmitter and the receiver, or in other cases, the transceiver.

In MIMO systems, each of a plurality of data streams is individually mapped and modulated before being precoded and transmitted by different physical antennas or effective antennas. The combined data streams are then received at multiple antennas of a receiver. At the receiver, each data stream is separated and extracted from the combined signal. This process is generally performed using a minimum mean squared error (MMSE) or MMSE-successive interference cancellation (SIC) algorithm.

Additionally, a downlink physical signal corresponds to a set of resource elements used by the physical layer but does not carry information originating from higher layers. The following downlink physical signals are defined: Synchronization signal and Reference signal.

The reference signal consists of known symbols transmitted at a well defined OFDM symbol position in the slot. This assists the receiver at the user terminal in estimating the channel impulse response to compensate for channel distortion in the received signal. There is one reference signal transmitted per downlink antenna port and an exclusive symbol position is assigned for an antenna port (when one antenna port transmits a reference signal other ports are silent). Reference signals (RS) are used to determine the impulse response of the underlying physical channels.

SUMMARY

For use in a wireless communication network, a method for communicating with a plurality of subscriber stations is provided. The method includes transmitting control information and data to at least one of the plurality of subscriber stations in a subframe. Transmitting the control information includes identifying a set of RS patterns to be used to communicate with the at least one of the plurality of subscriber stations. In addition, a state is assigned to the at least one of the plurality of subscriber stations, the state comprising a subset of antenna port numbers within the set of RS patterns. Transmitting the control information also includes indicating the assigned state in a Downlink Control Information (DCI) format, wherein the DCI format is transmitted in a Physical Downlink Control Channel (PDCCH). Transmitting the data includes transmitting a plurality of resource blocks in the subframe and transmitting the data using a subset of antenna ports corresponding to the subset of antenna port numbers. Transmitting the data also includes mapping reference signals corresponding to the subset of antenna ports according to at least one RS pattern within the set of RS patterns.

A subscriber station capable of communicating with a plurality of base stations is provided. The subscriber station includes a receiver configured to receive control information and data from at least one of the plurality of base stations in a subframe. The receiver is configured to receive a plurality of resource blocks in the subframe. The control information is configured to identify a set of RS patterns to be used to communicate with the at least one of the plurality of base stations; and assign a state to the subscriber station. The state includes a subset of antenna port numbers within the set of RS patterns and is indicated in a Downlink Control Information (DCI) format transmitted in a Physical Downlink Control Channel (PDCCH). The subscriber station includes a controller configured to cause the receiver to receive the data using a subset of antenna ports corresponding to the subset of antenna port numbers and identify reference signals corresponding to the subset of antenna ports mapped according to at least one RS pattern within the set of RS patterns.

A base station capable of communicating with a plurality of subscriber stations is provided. The base station includes a transmit path including circuitry configured to transmit control information and data to at least one of the plurality of subscriber stations in a subframe. The control information is configured to identify a set of RS patterns to be used to communicate with the at least one of the plurality of subscriber stations; assign a state to the at least one of the plurality of subscriber stations, the state comprising a subset of antenna port numbers within the set of RS patterns; and indicate the assigned state in a Downlink Control Information (DCI) format. The DCI format is transmitted in Physical Downlink Control Channel (PDCCH). The transmit path is configured to transmit a plurality of resource blocks in the subframe; transmit the data using a subset of antenna ports corresponding to the subset of antenna port numbers; and map reference signals corresponding to the subset of antenna ports according to at least one RS pattern within the set of RS patterns.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller"

means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2A illustrates a high-level diagram of an orthogonal frequency division multiple access transmit path according to an exemplary embodiment of the disclosure;

FIG. 2B illustrates a high-level diagram of an orthogonal frequency division multiple access receive path according to an exemplary embodiment of the disclosure;

FIGS. 9A and 9B illustrate perceived resource mapping at a legacy subscriber station and an advanced subscriber station according to embodiments of the present disclosure;

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

Figure 1:
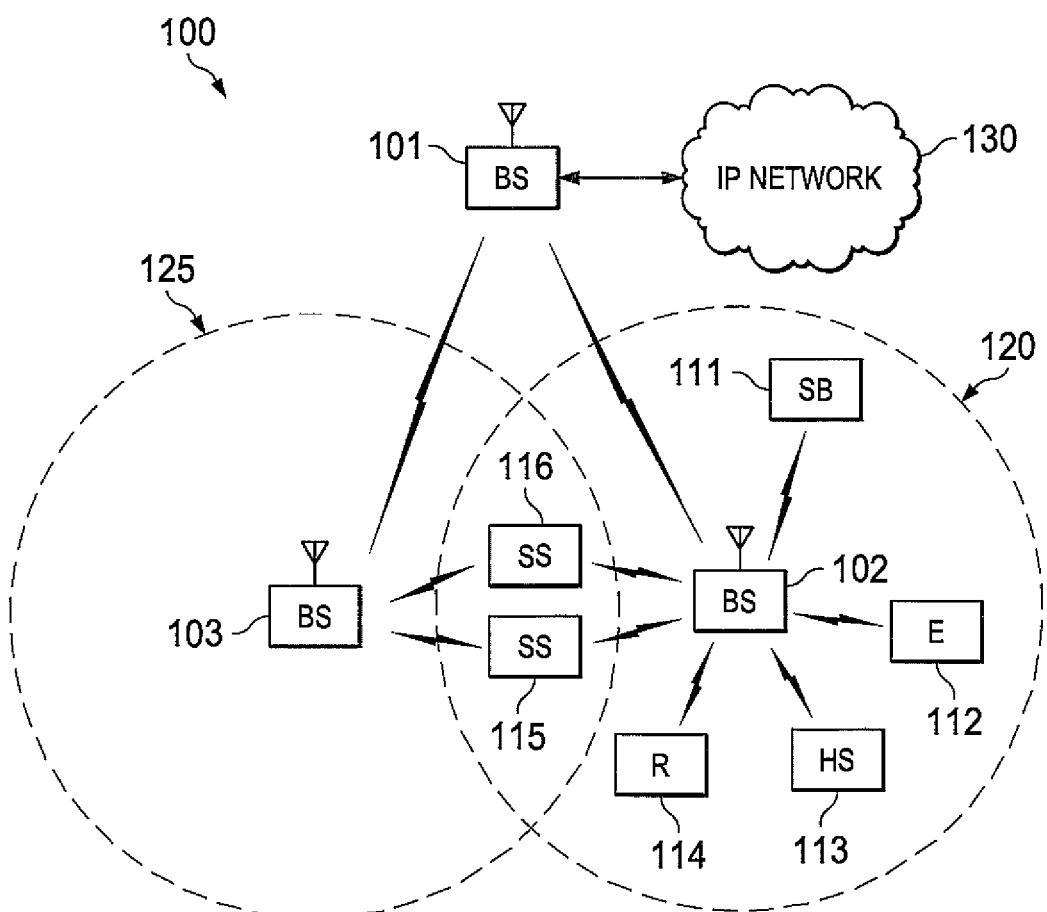
FIG. 1 illustrates an exemplary wireless network, which transmits ACK/NACK messages according to an exemplary embodiment of the disclosure.

FIG. 1 illustrates an exemplary wireless network 100, which transmits ACK/NACK messages according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a wireless fidelity (WiFi) hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

FIG. 2A is a high-level diagram of an orthogonal frequency division multiple access (OFDMA) transmit path. FIG. 2B is a high-level diagram of an orthogonal frequency division multiple access (OFDMA) receive path. In FIGS. 2A and 2B, the OFDMA transmit path is implemented in base station (BS) 102 and the OFDMA receive path is implemented in subscriber station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230, a reference signal multiplexer 290, and a reference signal allocator 295. The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., LDPC coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency. In some embodiments, reference signal multiplexer 290 is operable to multiplex the reference signals using code division multiplexing (CDM) or time/frequency division multiplexing (TFDM). Reference signal allocator 295 is operable to dynamically allocate reference signals in an OFDM signal in accordance with the methods and system disclosed in the present disclosure.

The base station 102 can enable (e.g., activate) all of its antenna ports or a subset of antenna ports. For example, when BS 102 includes eight antenna ports, BS 102 can enable four of the antenna ports for use in transmitting information to the subscriber stations. It will be understood that illustration of BS 102 enabling four antenna ports is for example purposes only and that any number of antenna ports could be activated.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

Figure 3:
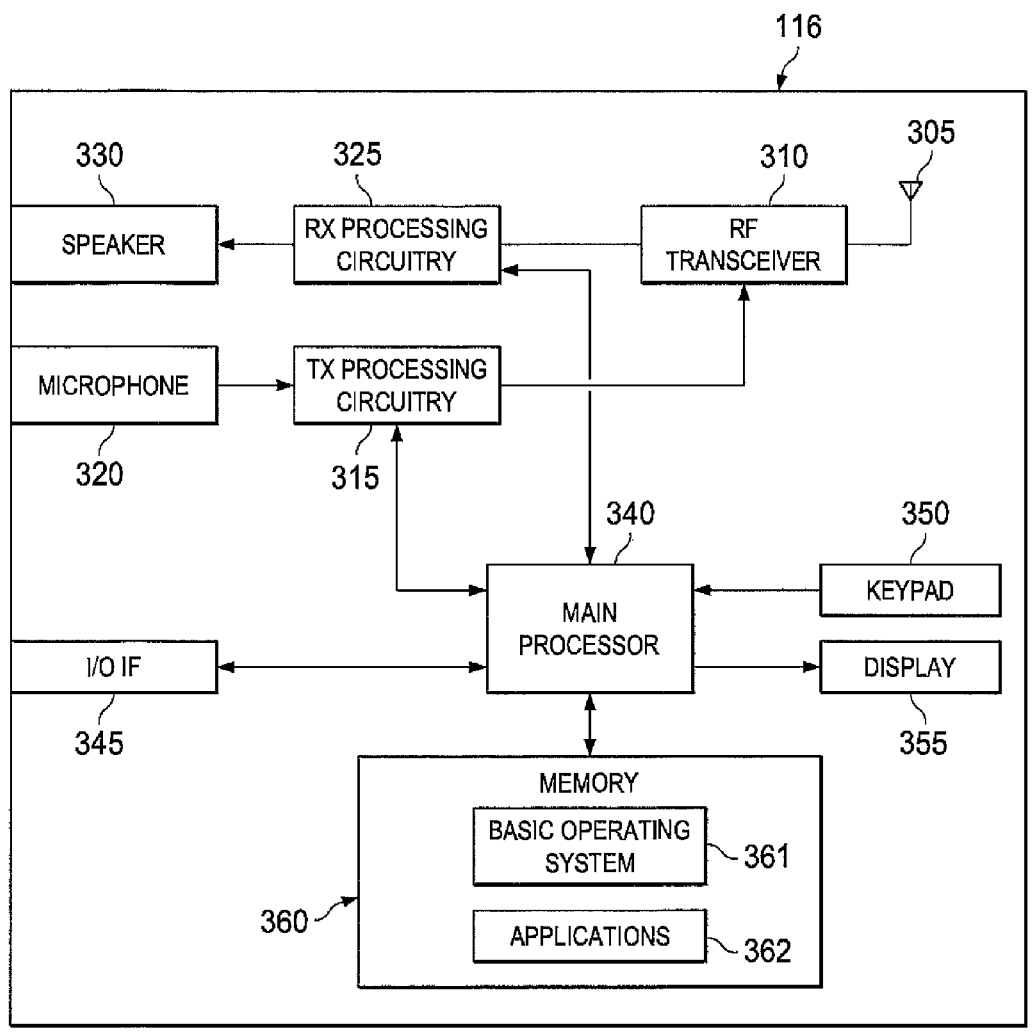
FIG. 3 illustrates an exemplary wireless subscriber station according to embodiments of the present disclosure.

FIG. 3 illustrates an exemplary wireless subscriber station according to embodiments of the present disclosure. The embodiment of wireless subscriber station 116 illustrated in FIG. 3 is for illustration only. Other embodiments of the wireless subscriber station 116 could be used without departing from the scope of this disclosure.

Wireless subscriber station 116 comprises antenna 305, radio frequency (RF) transceiver 310, transmit (TX) processing circuitry 315, microphone 320, and receive (RX) processing circuitry 325. SS 116 also comprises speaker 330, main processor 340, input/output (I/O) interface (IF) 345, keypad 350, display 355, and memory 360. Memory 360 further comprises basic operating system (OS) program 361 and a plurality of applications 362.

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In some embodiments of the present disclosure, main processor 340 is a microprocessor or microcontroller. Memory 360 is coupled to main processor 340. According to some embodiments of the present disclosure, part of memory 360 comprises a random access memory (RAM) and another part of memory 360 comprises a Flash memory, which acts as a read-only memory (ROM).

Main processor 340 executes basic operating system (OS) program 361 stored in memory 360 in order to control the overall operation of wireless subscriber station 116. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360, such as operations for CoMP communications and MU-MIMO communications. Main processor 340 can move data into or out of memory 360, as required by an executing process. In some embodiments, the main processor 340 is configured to execute a plurality of applications 362, such as applications for CoMP communications and MU-MIMO communications. The main processor 340 can operate the plurality of applications 362 based on OS program 361 or in response to a signal received from BS 102. Main processor 340 is also coupled to I/O interface 345. I/O interface 345 provides subscriber station 116 with the ability to connect to other devices such as laptop computers and handheld computers. I/O interface 345 is the communication path between these accessories and main controller 340.

Main processor 340 is also coupled to keypad 350 and display unit 355. The operator of subscriber station 116 uses keypad 350 to enter data into subscriber station 116. Display 355 may be a liquid crystal display capable of rendering text and/or at least limited graphics from web sites. Alternate embodiments may use other types of displays.

The Multi-user MIMO (MU-MIMO) operation is specified for 3GPP LTE system 3GPP TS 36.211 v 8.6.0, "*E-UTRA, Physical channels and modulation*", March 2009; 3GPP TS 36.212 v 8.6.0, "*E-UTRA, Multiplexing and Channel coding*", March 2009; and 3GPP TS 36.213 v8.6.0, "*E-UTRA, Physical Layer Procedures*", March 2009, the contents of each are incorporated by reference. For example, the base station 102 can communicate control information to the SS 116 using downlink control information (DCI) format defined in sections 5.3.3.1.3 and 5.3.3.1.5A of *E-UTRA, Multiplexing and Channel coding*. In addition, modulation order determination, such as modulation and transport block size determination, can be performed according to sections 7.1.7.1 and 7.1.7.2 of *E-UTRA, Physical Layer Procedures*. Further R1-094413, "*Way forward on the details of DCI format 2B for enhanced DL transmission,*" 3GPP RAN1#58bis, Miyazaki, October 2009, the contents of which are hereby incorporate by reference, defines a DCI format 2B based on DCI format 2A.

FIGS. 4A through 4E illustrate rank patterns for downlink reference signals (DRS) according to embodiments of the present disclosure. The embodiments of the rank patterns shown in FIGS. 4A through 4E are for illustration only. Other embodiments could be used without departing from the scope of this disclosure.

Rank-2 Pattern A 400 and Rank-2 Pattern B 405 are pilot patterns that can support up to 2 layer transmissions, where DRS resource elements (REs) 410 (labeled with 0, 1), which carry DRS for layer-0 and layer-1 with the two layers' reference signals (RS), are code-division multiplexed. Similarly, the DRS REs 415 (labeled with 2, 3) are code-division multiplexed. In the two adjacent DRS REs 415 labeled with 0, 1, DRS symbols [r0 r1] for layer 0 are mapped to the two REs spread by a Walsh code [1 1], which results in [r0 r1]; while DRS symbols r2 and r3 for layer 1 are mapped to the two REs spread by a Walsh code [1−1], which results in [r2−r3].

Figure 4A:
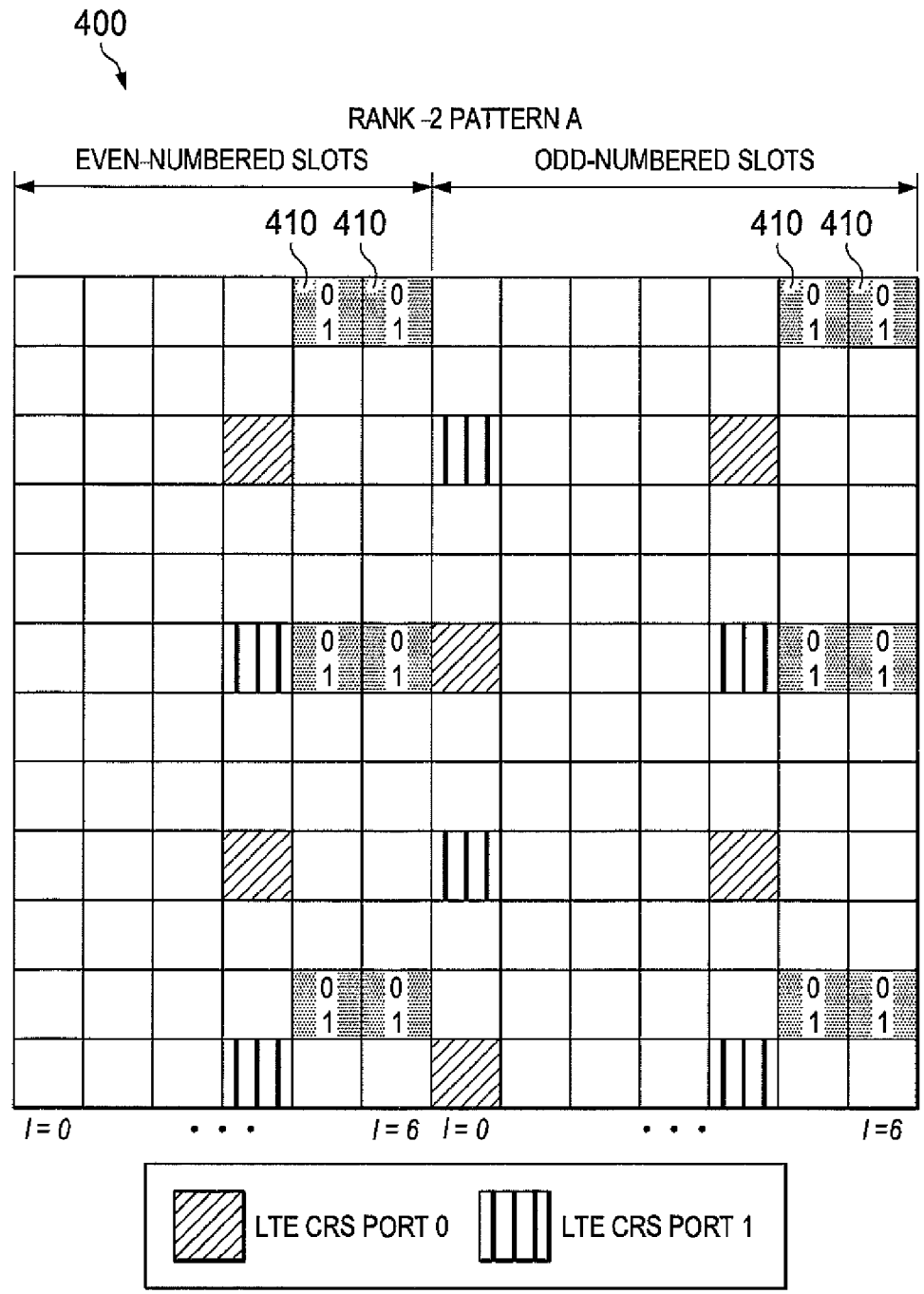
FIGS. 4A through 4E illustrate rank patterns for downlink reference signals (DRS) according to embodiments of the present disclosure.
Figure 4B:
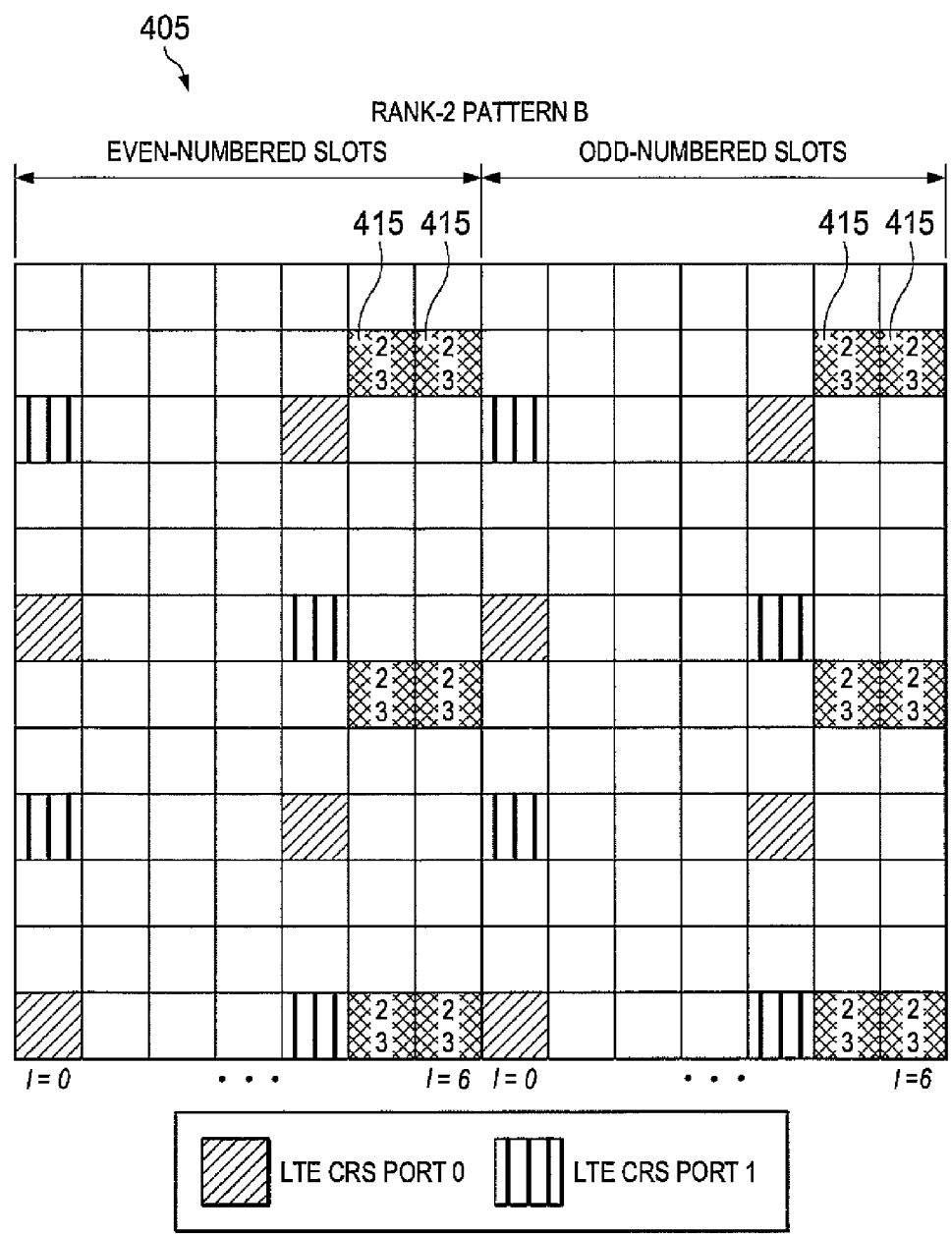
Figure 4C:
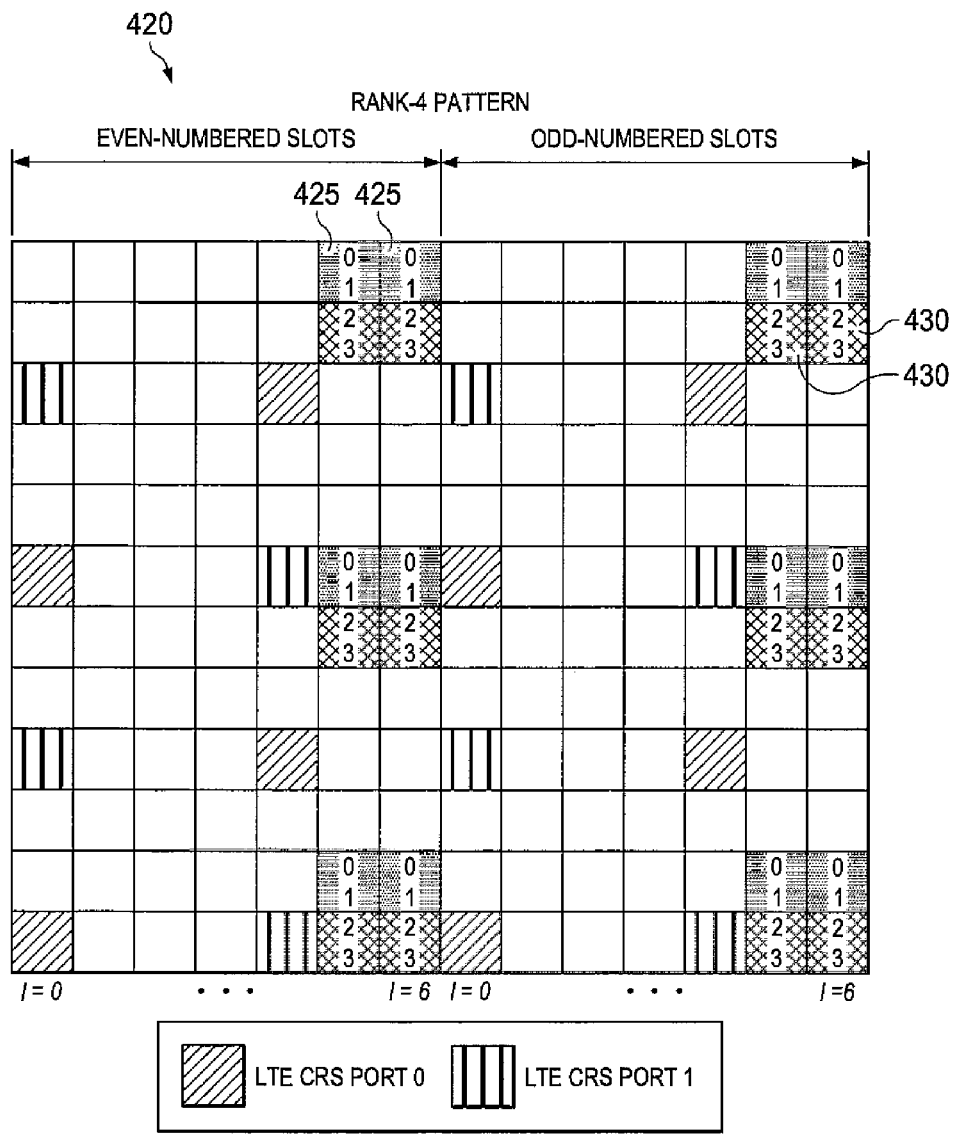

In the example shown in FIG. 4C, a pilot pattern is a rank-4 pattern 420 that can support up to four layer transmissions. In the rank-4 pattern 420, DRS REs are again partitioned into two, those labeled with 0, 1 and those with 2, 3. Here, DRS REs 425 (labeled with 0, 1), which carry DRS for layer 0 and 1 with the two layers' RS, are code-division multiplexed, and DRS REs 430 (labeled with 2, 3), which carry DRS for layer 2 and 3 with the two layers' RS are code-division multiplexed.

Figure 4D:
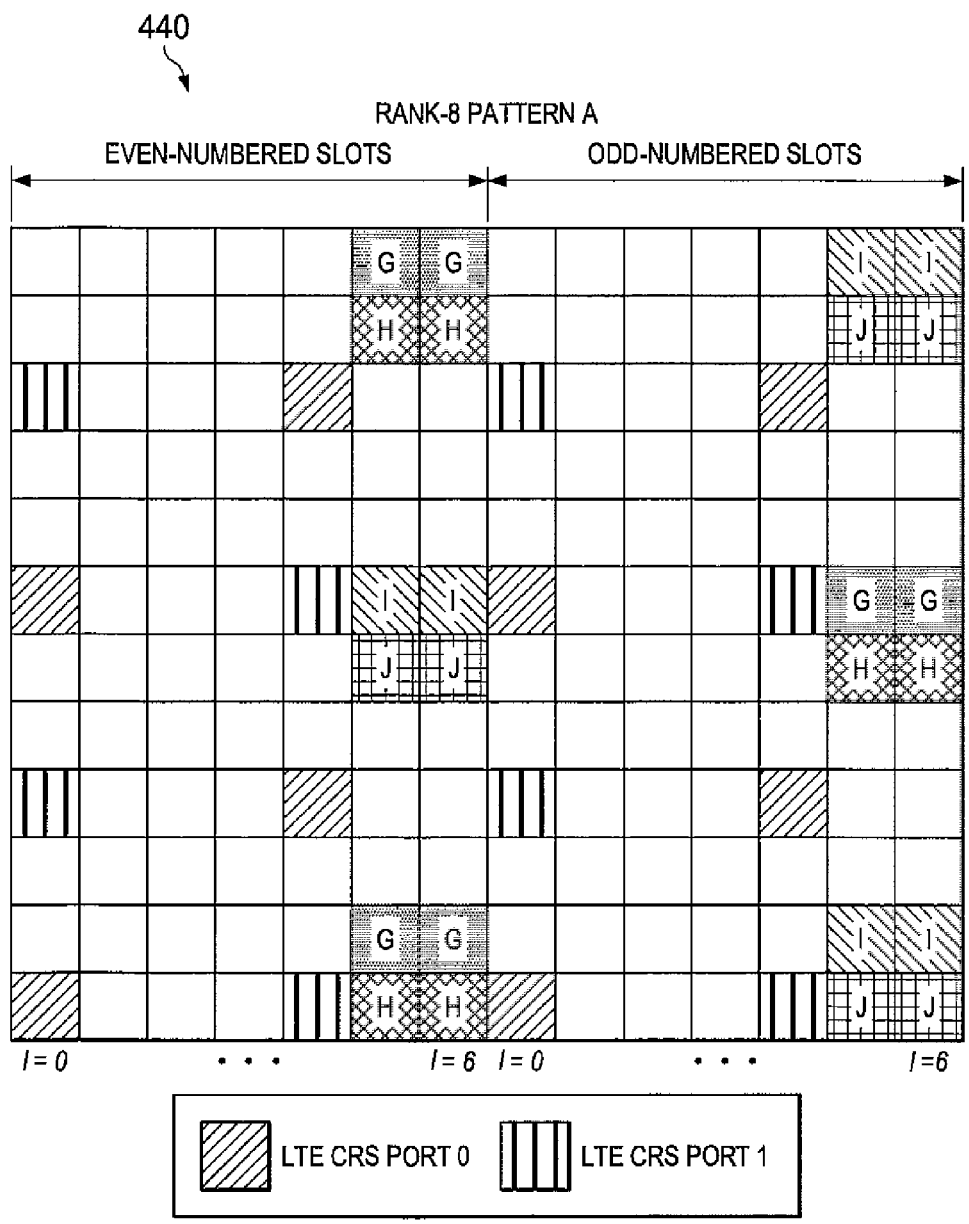
Figure 4E:
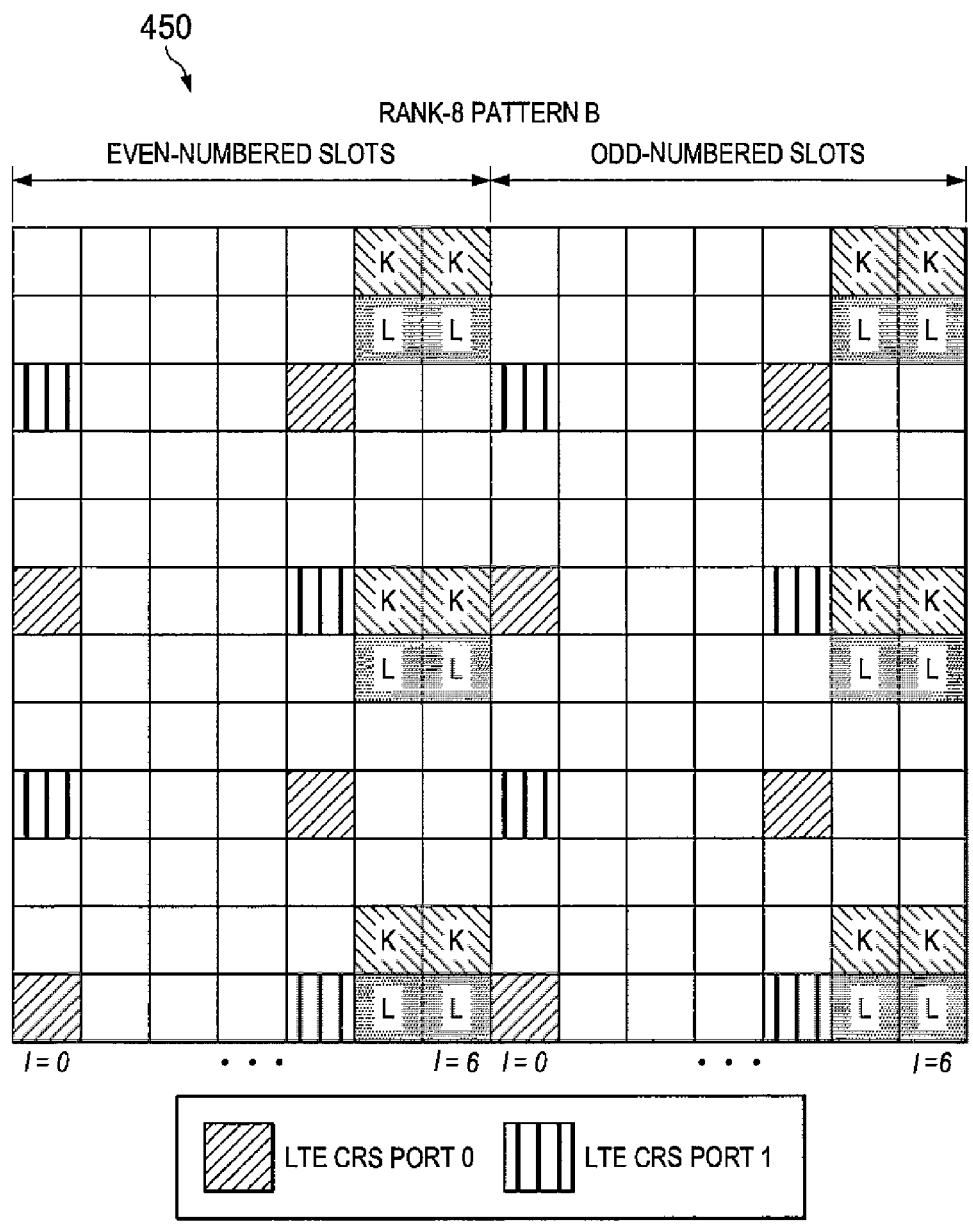

Examples of 8 DRS patterns 440, 450 based on CDM DRS multiplexing are shown in FIGS. 4D and 4E respectively. In the examples, REs labeled with one of G, H, I, J, L, K, are used for carrying a respective number of DRS among the 8 DRS's, where the number of DRS are code-division multiplexed. Rank-8 pattern A 440 is based on spreading factor of 2 code-division multiplex (CDM) across two time-adjacent REs with the same alphabet label, while Rank-8 pattern B 450 is based on spreading factor 4 CDM across two groups of two time-adjacent REs with the same alphabet label. The 8 antenna ports in a Rank-8 pattern are referenced as antenna ports 4, 5, 6, 7, 8, 9, 10, 11 in the sequel to distinguish them from the antenna ports in Rank-2 patterns 400, 405 and Rank-4 pattern 420. In some embodiments, such as in Rel-8 LTE, antenna ports 0, 1, 2, 3, 4, 5 are used for cell-specific reference signals (CRS), multi-media broadcast over a single frequency network (MBSFN) RS and Rel-8 DRS. Therefore, using the numbering convention extending Rel-8 LTE, the new antenna port numbers will start from 6; Rank-2 patterns 400, 405 will have antenna ports 6, 7; Rank-4 pattern 420 will have antenna ports 6, 7, 8, 9; and Rank-8 patterns 440, 450 will have antenna ports 10, 11, 12, 13, 14, 15, 16, 17.

In one example implementation of Rank-8 pattern A 440, G carries DRS 4, 5; H carries DRS 6, 7; I carries DRS 8, 9; and J carries DRS 10, 11. Alternatively, in one example implementation of Rank-8 pattern B 450, K carries DRS 4, 5, 6, 7; and L carries DRS 8, 9, 10, 11.

Figure 5A:
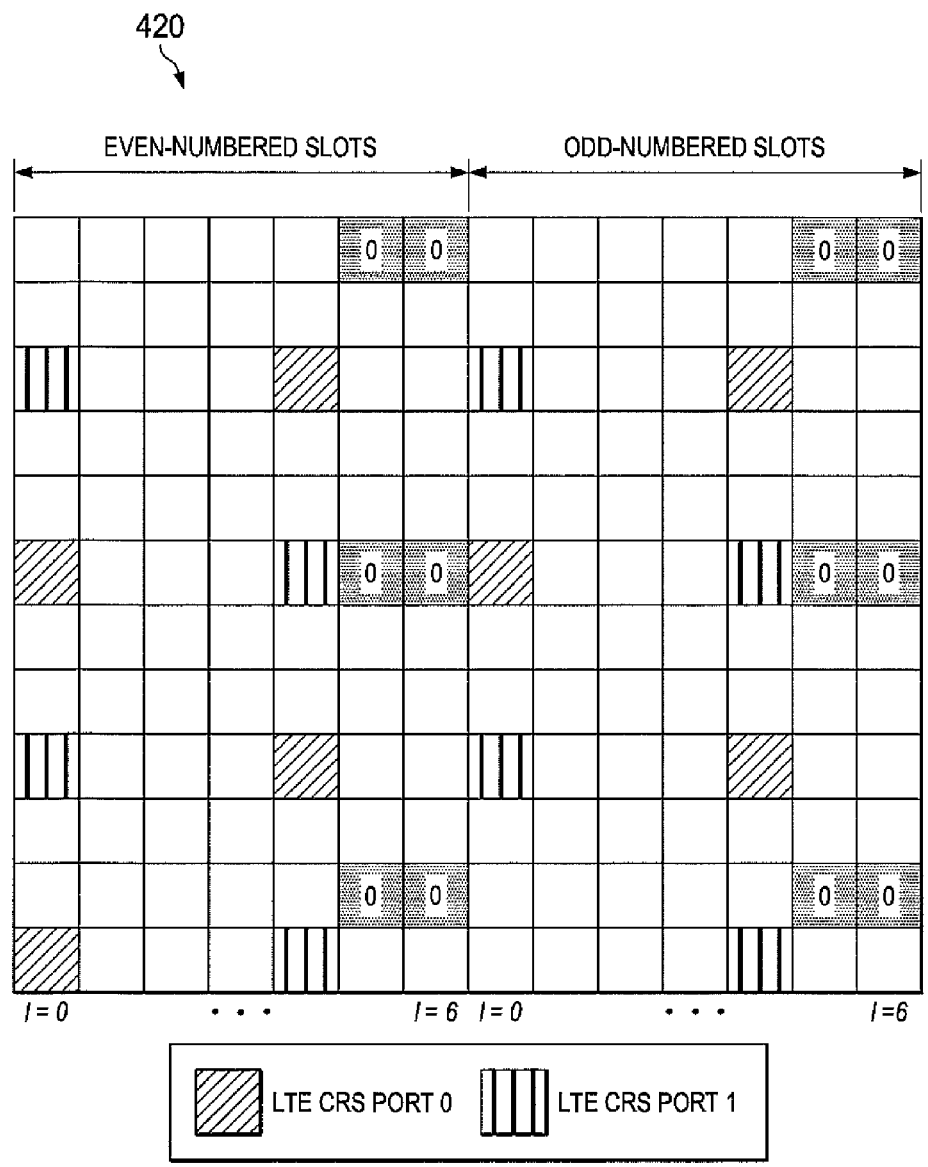
FIGS. 5A and 5B illustrate subscriber station behavior with respect to two subscriber stations operating in multi-user MIMO (MU-MIMO) mode according to embodiments of the present disclosure.
Figure 5B:
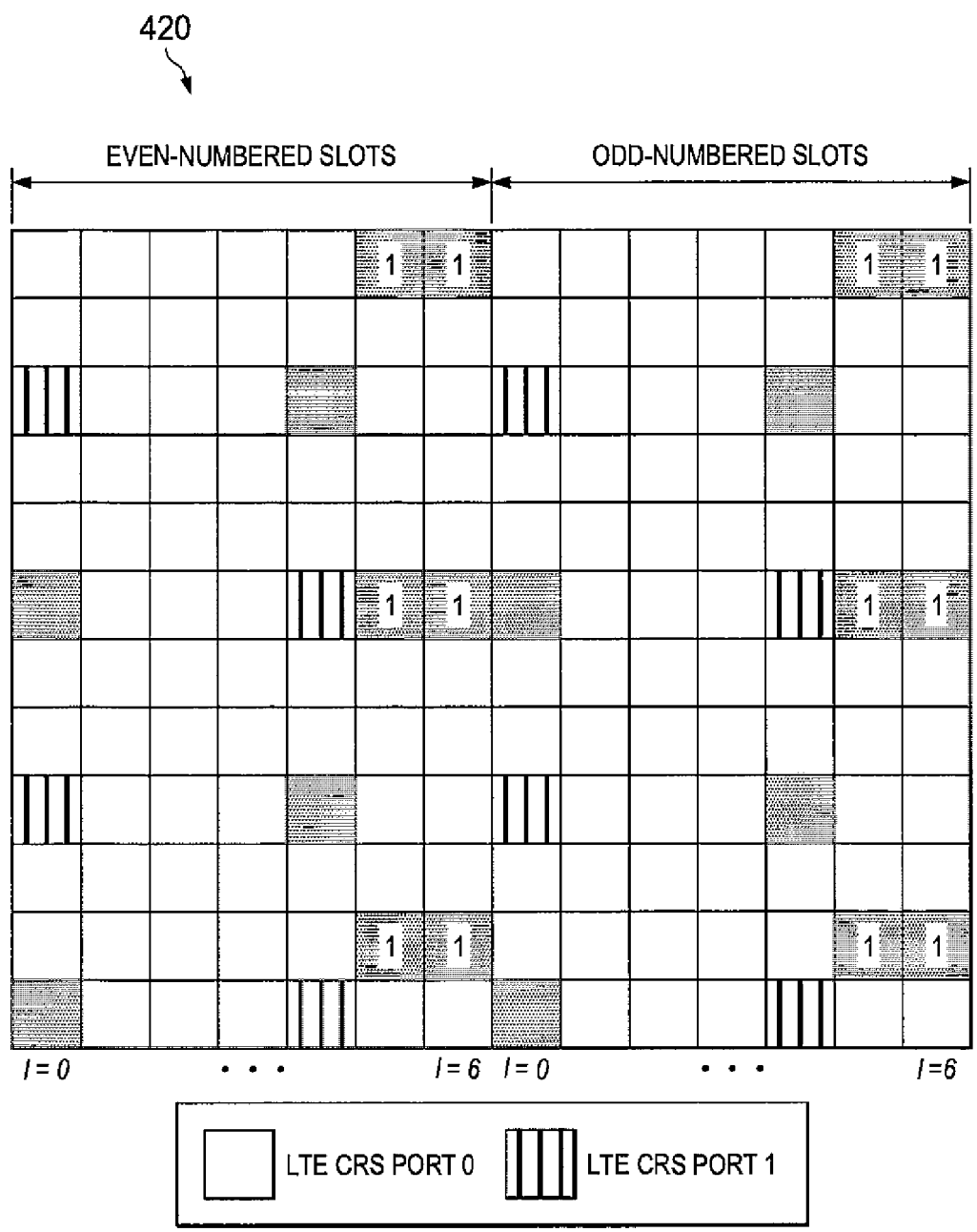

FIGS. 5A and 5B illustrate subscriber station behavior with respect to two subscriber stations operating in multi-user MIMO (MU-MIMO) mode according to embodiments of the present disclosure. The embodiment of the subscriber station behavior shown in FIGS. 5A and 5B are for illustration only. Other embodiments could be used without departing from the scope of this disclosure.

In the example shown in FIGS. 5A and 5B, the two SSs, such as SS 115 and SS 116, are scheduled in a subframe (SS 115 and SS 116) in which it is indicated that the Rank-2 DRS pattern A 400 will be used. In the example shown in FIG. 5A, SS 115 with i_DRS=0, sees DRS(0) RE as demodulation pilot, and sees other RE (other than CRS and DRS(0)) as data. In the example shown in FIG. 5B, SS 116 with i_DRS=1 only sees DRS(1) RE as demodulation pilot, and sees other RE (other than CRS and DRS(1)) as data. Then, each SS's 115, 116 behavior is as follows:

For SS 115, i_DRS=0, which means that the first DRS pattern, DRS(0), is used for SS 115; and For SS 116, i_DRS=1, which means that the second DRS pattern, DRS(1), is used for SS 116.

Therefore, each SS's 115, 116 behavior/observation on data section and DRS section is illustrated in FIGS. 5A and 5B. For example SS 115 only sees DRS(0) as a pilot RE and other RE (other than CRS and DRS(0)) as data RE; whereas SS 116 only sees DRS(1) as the pilot RE and other RE (other than CRS and DRS(1)) as data RE. Further, in the examples shown in FIGS. 5A and 5B, different CDM spreading codes have been applied to DRS(0) and DRS(1).

Data and pilots, including channel state information (CSI) RS and demodulation reference signals (DMRS) are multiplexed together in a unit of time-frequency resource (or a resource block, an RB) in the OFDM-based wireless communication system 100.

There are two types of signaling in the OFDM-based wireless communication system 100. One type is physical-layer signaling and the other type is higher-layer signaling.

Physical-layer signaling includes dynamic signaling, where, the dynamic signaling may happen in physical downlink control channel (PDCCH) in those subframes where the base station, such as BS 102, wants to transmit signals to the SS, such as SS 116. For this type of dynamic signaling, a downlink control information (DCI) format can be defined, where DCI is transmitted in PDCCH.

Higher-layer signaling includes broadcast signaling and RRC signaling, which can be semi-static signaling. Broadcast signaling lets the SSs know cell-specific information, while RRC signaling let SSs know SS-specific information.

Downlink (DL) grants are considered as DCI and they are sent by a base station, such as BS 102, to at least one SS, such as SS 116. DL grants can be SS-specific, implying that a DL grant contains DCI useful to only one SS, such as SS 116. A number of DCI formats are defined for DL grants, and each DL grant is carried in PDCCH in subframes. A DL grant for an SS includes resource assignments (RA), transmission rank, and modulation and coding rate (MCS). RA indicates time-frequency resources (or RBs) that will carry data signals to the SS. Transmission rank indicates a number of streams (or layers) that the SS is supposed to receive in the RBs indicated by the RA. For each codeword (CW), one set of MCS is indicated to the SS. A DL grant may also contain DM RS (or layer or stream) indices for the SS, so that the SS can perform channel estimation and demodulation reading the RS indicated by the DM RS indices. Related methods have been disclosed in U.S. patent application Ser. No. 12/692,385 entitled "SYSTEM AND METHOD FOR MULTI-USER AND MULTI-CELL MIMO TRANSMISSIONS" and U.S. patent application Ser. No. 12/797,718 entitled "METHOD AND SYSTEM FOR INDICATING METHOD USED TO SCRAMBLE DEDICATED REFERENCE SIGNALS", the contents of each are hereby incorporated by reference in their entirety.

A transport block (TB) is a bit stream carried from a higher layer. In the physical layer, a TB is mapped into a codeword (CW). In the Rel-8 LTE, up to two TBs (and, therefore, up to two CWs) can be scheduled to SS 116 in a set of time-frequency resources in a subframe. For spatial multiplexing (SM) in the LTE system, including Rel-8 and Rel-10, as described in "3GPP TR 36.814 v1.2.2, "Further Advancements of E-UTRA, Physical layer aspects," June 2009", the contents of which are hereby incorporated by reference, CW-to-layer mapping is defined as in section 6.3.3.2 of *E-UTRA, Physical channels and modulation* and downlink spatial multiplexing is defined in section 7.2 of *Further Advancements of E-UTRA, Physical layer aspects*. Furthermore, a toggle bit, for use in HARQ processes, is defined in 3GPP TS 36.321 V8.3.0, "*E-UTRA, Medium Access Control (MAC) protocol specification*," September 2009, the contents of which are hereby incorporated by reference.

Figure 6:
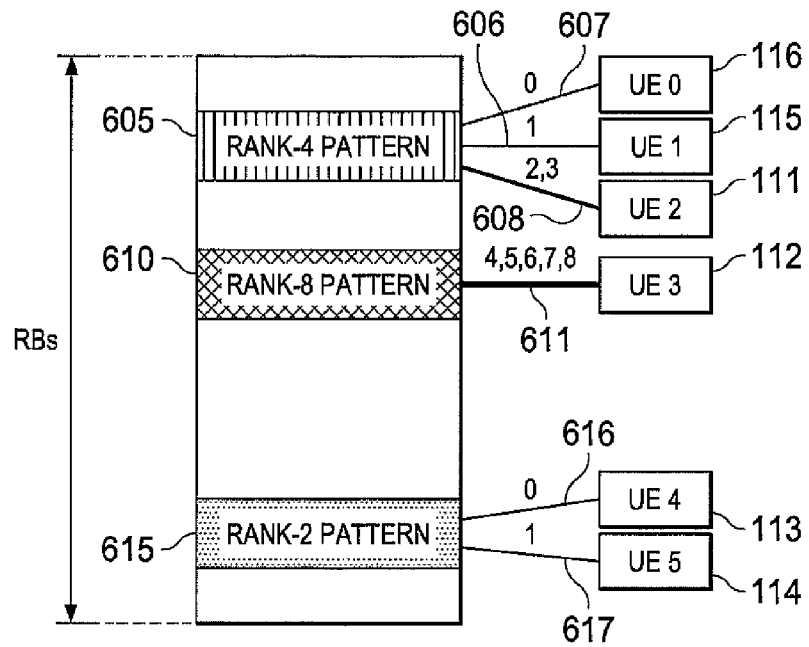
FIG. 6 illustrates an exemplary resource block usage within a subframe according to embodiments of the present disclosure.

FIG. 6 illustrates an exemplary resource block usage within a subframe according to embodiments of the present disclosure. The embodiment of the resource block usage shown in FIG. 6 is for illustration only. Other embodiments could be used without departing from the scope of this disclosure.

In some embodiments, RBs in a subframe can have different DM RS patterns. In some embodiments, multiple SSs can be scheduled in the same RB, each with different number of layers.

In one RB 605, BS 102 uses a rank-4 pattern 420, and multiplex signals intended to SS 116, SS 115 and SS 111. SS 116 receives data stream 606 together with DM RS 0. SS 115 receives data stream 607 together with DM RS 1. SS 111 receives data stream 608 together with DM RS 2, 3. In another RB 610, BS 102 uses a rank-8 pattern 440, 450, and transmits signals to only one SS, SS 112. SS 112 receives data stream 611 together with DM RS 4, 5, 6, 7, 8, 9. In another RB 615, BS 102 uses a rank-2 pattern 400, 405, and transmits signals to SS 113 and SS 114. SS 113 receives data stream 616 together with DM RS 0. SS 114 receives data stream 617 together with DM RS 1.

In some embodiments, BS 102 can inform SS 116 (or a group of SSs, such as SS 114-SS 116) either in a dynamic manner or in a semi-static manner regarding a set of possible DM RS patterns. BS 102 can inform SS 116 either by physical-layer signaling or higher-layer signaling.

In some embodiments, a transmission mode includes a list (or definition set) that includes a set of DM RS patterns that can be used for transmissions. BS 102 can configure SS 116 (or a group of SSs) in a transmission mode, where this configuration is done by a higher-layer signaling.

For example, BS 102 can configure SS 116 in a transmission mode by a higher-layer signaling, where the transmission mode supports Rank-4 pattern 420 and Rank-8 pattern A 440. Then, SS 116 expects transmission of RBs having either of the DM RS patterns of: Rank-4 pattern 420 and Rank-8 pattern A 440.

In one example, BS 102 informs, by physical-layer or higher-layer signaling, or configuring a transmission mode, a first group of SSs, such as SS 114-SS 116, that the possible DM RS patterns are Rank-2 pattern A 400, Rank-4 pattern 420 and Rank-8 pattern A 440; BS 102 informs a second group of SSs, such as SS 111-SS 113, that the possible DM RS patterns are Rank-2 pattern B 405, Rank-4 pattern 420 and Rank-8 pattern A 440.

After receiving signaling from BS 102 that inform a set of possible DM RS patterns, SS 116 interprets downlink grants from BS 102 accordingly.

In some embodiments, BS 102 informs SS 116 regarding one DM RS pattern among a set of possible DM RS patterns either in a dynamic manner or in a semi-static manner, which is done either by physical-layer signaling or higher-layer signaling. Upon receiving signals in the RBs indicated by a DL grant from BS 102 in a subframe, SS 116 performs channel estimation for demodulation by extracting the RS in the REs in the indicated DM RS pattern, and demodulates data signals by extracting signals in the REs in the scheduled RBs, excluding the REs in the indicated DM RS pattern.

In another example, BS 102 informs SS 116 that there are three possible DM RS patterns, which are Rank-2 pattern A 400, Rank-4 pattern 420 and Rank-8 pattern A 440. In a subframe, BS 102 transmits a DCI through PDCCH to SS 116, indicating that RBs 3, 6, 7 contain signals for SS 116, that the DM RS 0 and 1 and streams 606 and 607 carry signals for SS 116, and that the Rank-4 pattern 420 is used. Then, in the subframe, SS 116 receives signals from the resource elements (REs) in RBs 3, 6 and 7, and SS 116 assumes the Rank-4 pattern 420 for finding out the REs carrying the DM RS and the REs carrying the data signals. SS 116 estimates the channels associated with DM RS 0 and 1 whose REs and Walsh codes are indicated by the Rank-4 pattern 420. In addition, SS 116 demodulates data signals from the REs in RBs 3, 6 and 7 excluding the REs for DM RS 0, 1, 2, 3 in the Rank-4 pattern 420.

Therefore, for channel estimation and demodulation, SS 116 is supposed to know which DM RS pattern is used and the DM RS indices within the selected DM RS pattern.

In some embodiments, BS 102 informs SS 116 regarding a selected DM RS pattern among a set of possible DM RS patterns and a DM RS index set within the selected DM RS pattern for transmission. Multiple combinations exist of (dynamic, semi-static) indication of a selected DM RS pattern and (dynamic, semi-static) indication of the DM RS indices within the selected DM RS pattern, as shown in Error! Reference source not found.

TABLE 1

Signaling methods of a DM RS pattern and a DM RS index set within a selected DM RS pattern

| index set a DM RS Pattern | DM RS Dynamically signaled | Semi-statically signaled |
|---|---|---|
| Dynamically signaled | Signaling Method A | Signaling Method B |
| Semi-statically signaled | Signaling Method C | Signaling Method D |

From Rank-2 patterns A 400 and B 405, Rank-4 pattern 420 and either one of the Rank-8 patterns 440, 450, all the possible states, where each state conveys information on a combination of a selected DM RS pattern and a DM RS index set within the selected DM RS pattern, are listed below:

DM RS index sets in Rank-2 pattern A 400: there are $2^2-1=3$ subsets from a set $\{0,1\}$, excluding the empty set.

TABLE 2

| State 0 = {0} | State 1 = {1} | State 2 = {0,1} |
|---|---|---|

When SS 116 is informed one of these states (or one of these index sets) by BS 102, SS 116 estimates channels from RS REs corresponding to the informed index set in Rank-2 pattern A 400 for demodulation; and SS 116 does not expect data signals from all the RS REs in Rank-2 pattern A 400.

When BS 102 indicates SS 116 one of these states (or one of these index sets), BS 102 does not send data signals to SS 116 in all the RS REs in Rank-2 pattern A 400.

DM RS index sets in Rank-4 pattern 420: there are $2^4-1=15$ subsets from a set $\{0, 1, 2, 3\}$, excluding the empty set.

TABLE 3

| State 3 = {0} | State 4 = {1} | State 5 = {2} | State 6 = {3} |
|---|---|---|---|
| State 7 = {0,1} | State 8 = {1,2} | State 9 = {2,3} | State 10 = {3,0} |
| State 11 = {0,2} | State 12 = {1,3} | State 13 = {0,1,2} | State 14 = {1,2,3} |
| State 15 = {2,3,0} | State 16 = {3,0,1} | State 17 = {0,1,2,3} | |

When SS 116 is informed regarding one of these states (or one of these index sets) by BS 102, SS 116 estimates channels from RS REs corresponding to the informed index set in Rank-4 pattern 420 for demodulation; and SS 116 does not expect data signals from all the RS REs in Rank-4 pattern A 440.

When BS 102 indicates to SS 116 regarding one of these states (or one of these index sets), BS 102 does not send data signals to SS 116 in all the RS REs in Rank-4 pattern 420.

DM RS index sets in a Rank-8 pattern 440, 450: there are $2^8-1=255$ subsets from a set $\{4,5,6,7,8,9,10,11\}$, excluding the empty set.

States 18 through 272 are defined for the 255 subsets, where one subset is corresponding to one state.

States 18, 19, 20, 21 indicate subset $\{4,5,6,7,8\}$, $\{4,5,6,7,8,9\}$, $\{4,5,6,7,8,9,10\}$, and $\{4,5,6,7,8,9,10,11\}$.

When SS 116 is informed one of these states (or one of these index sets) by BS 102, SS 116 estimates channels from RS REs corresponding to the informed index set in the Rank-8 pattern 440, 450. Furthermore, in some embodiments (e.g., an exemplary case 1), SS 116 does not expect data signals all the RS REs in the Rank-8 pattern 440, 450. In some other embodiments (e.g., an exemplary case 2), SS 116 does not expect data signals from RS REs corresponding to the informed index set.

When BS 102 indicates, to SS 116, one of these states (or one of these index sets):

In some embodiments (e.g., case 1), BS 102 does not send data signals to SS 116 in all the RS REs in the Rank-8 pattern 440, 450.

In some embodiments (e.g., case 2), BS 102 does not send data signals to SS 116 in the RS REs corresponding to the informed index set.

Figure 7A:
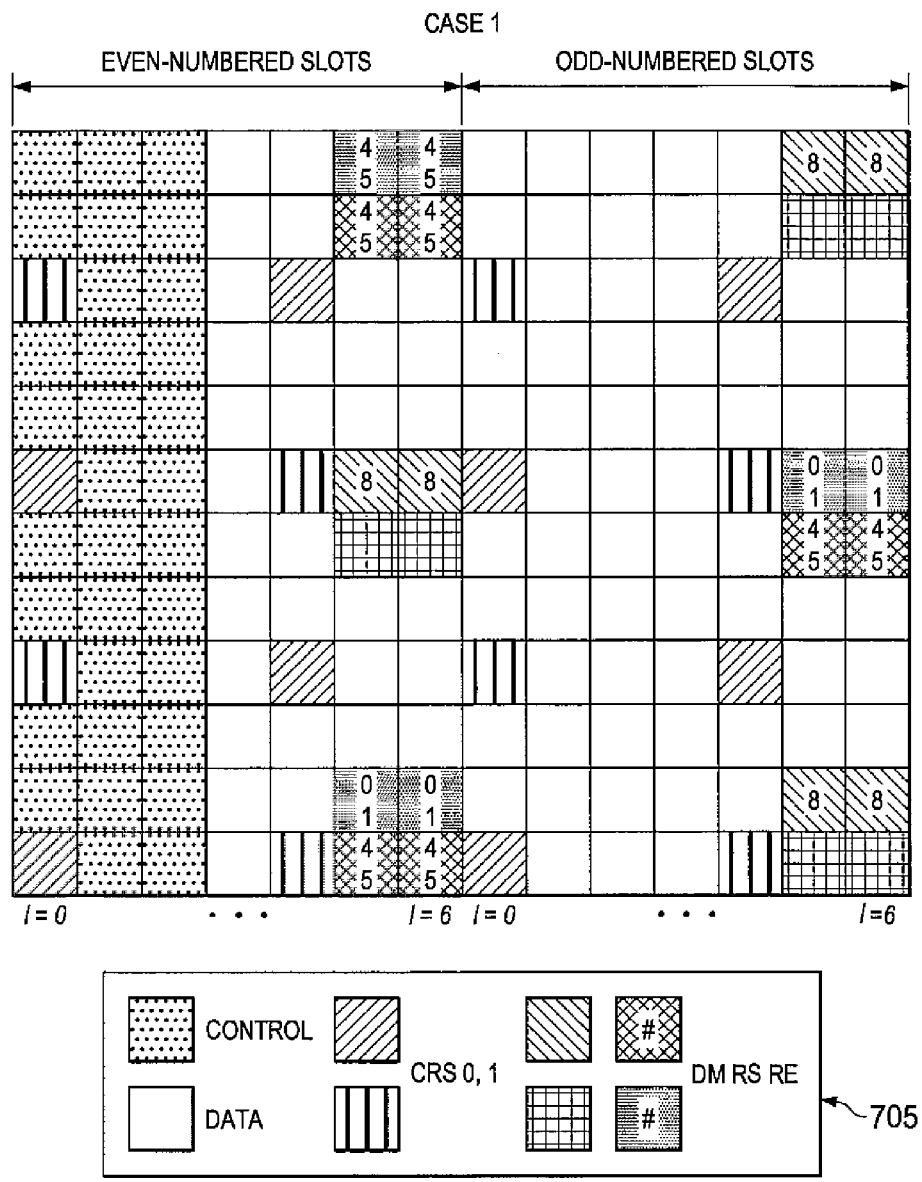
FIGS. 7A and 7B illustrate example SS behavior according to embodiments of the present disclosure.
Figure 7B:
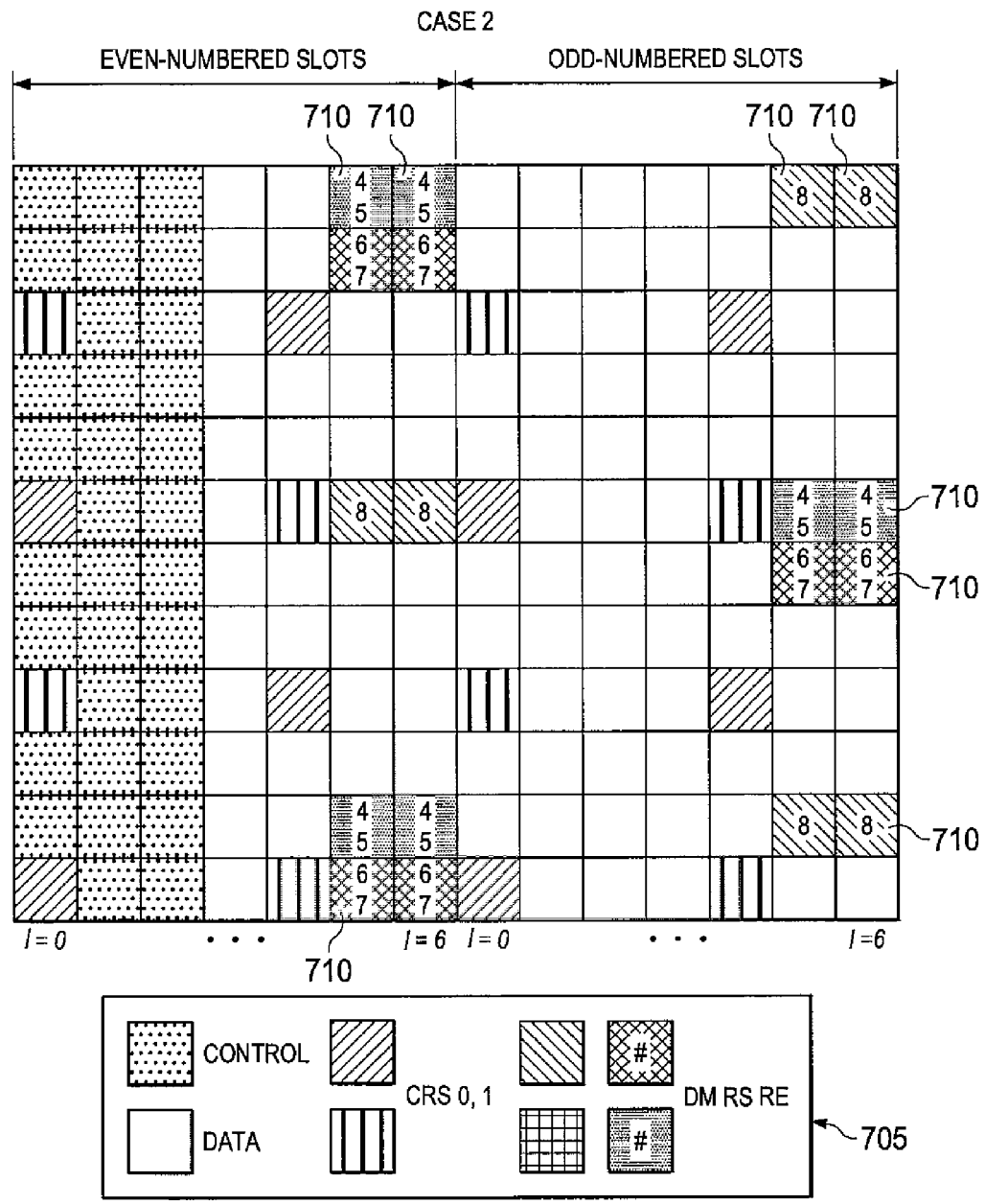

FIGS. 7A and 7B illustrate example SS behavior according to embodiments of the present disclosure. The embodiments shown in FIGS. 7A and 7B are for illustration only. Other embodiments could be used without departing from the scope of this disclosure.

FIGS. 7A and 7B show an example of an SS interpretation of REs in an RB for control, data, CRS and DM RS. In this example, BS 102 informs SS 116 that state 18, or a DM RS index set $\{4, 5, 6, 7, 8\}$ in Rank-8 pattern A 440 is to be assumed for channel estimation and demodulation at SS 116.

In some embodiments (e.g., case 1), SS 116 receives data signals from the data REs comprising the REs in an RB excluding CRS REs, control REs and all the RS REs in Rank-8 pattern A 440.

In some embodiments (e.g., case 2), SS 116 receives data signals from the data REs comprising the REs in an RB excluding CRS REs, control REs and the RS REs 705 labeled with 4,5,6,7 and 8 in Rank-8 pattern A 440.

DM RS index sets in Rank-2 pattern B 405: there are $2^2-1=3$ subsets from a set $\{2,3\}$, excluding the empty set.

TABLE 4

| State 273 = {2} | State 274 = {3} | State 275 = {2,3} |
|---|---|---|

When SS 116 is informed one of these states (or one of these index sets) by BS 102, SS 116 estimates channels from RS REs corresponding to the informed index set in Rank-2 pattern B 405 for demodulation; and SS 116 does not expect data signals from all the RS REs in Rank-2 pattern B 405.

When BS 102 indicates to SS 116 that one of these states (or one of these index sets), BS 102 does not send data signals to SS 116 in all the RS REs in Rank-2 pattern B 405.

There are a total of 6 (Rank-2 patterns A 400+B 405)+15 (Rank-4 pattern 420)+255 (one of the rank-8 patterns 440, 450)=276 states.

When method A is used, BS 102 dynamically indicates a DM RS pattern, together with the set of DMRS indices to SS 116, using a DL grant transmitted in PDCCH.

In some embodiments, a choice of states is restricted to a subset of Ns states out of the 276 states, and then a new DCI format is constructed, which includes fields that are able to generate enough code points to indicate the Ns states. The size of Ns can be fixed, or semi-statically indicated to SS 116. In the case when the size of Ns is semi-statically indicated to SS 116, SS 116 can assume that DCI format length will be variable dependant on the size of Ns.

There are many methods of restricting choice of states to a subset of Ns states out of the 276 states.

In some embodiments, the choice of states is not restricted out of the 276 states, that is, Ns=276. In this case, a new DCI format is designed to have fields that are able to generate enough codepoints to indicate all the 276 states listed above. In one example, we add one 9-bit field that includes 512 codepoints to an existing DCI format to indicate all the 276 states.

Bits in a DCI for a DL grant are encoded by a channel code, and carried in PDCCH. To ensure successful reception of a DL grant conveyed in a new DCI format composed of an increased number of bits at a UE, such as SS 116, experiencing a low SINR (signal-to-interference-and-noise-ratio), BS 102 may choose to reduce a coding rate, or to increase the number of coded bits, which increases the number of control REs used for a DL grant. However, control REs are scarce resources in OFDM systems, and hence BS 102 does not unnecessarily waste control REs. Alternatively, if the BS 102 chooses not to reduce the coding rate, SS 116, experiencing low SINR, may not be able to successfully receive the DL grant; in other words, BS 102's control coverage in a cell is reduced. To avoid the control coverage reduction or to facilitate efficient use of control resources in OFDM systems, it is desirable to keep a number of bits in a DCI format as small as possible. In this sense, adding 9-bit fields to an existing DCI format may not be desirable.

In some embodiments, methods are used for restricting the choice of states out of the 276 states, in order to minimize number of bits included in new DCI formats conveying a DL grant. In the following embodiments, some states are excluded from each of the DM RS patterns to minimize the signaling overhead.

In some embodiments, a rank-8 DM RS pattern 440, 450 is selected for DL transmission in an RB. Then, BS 102 assigns at least 5 streams to SS 116 together with the same number of orthogonal DM RS. A number "n" is used to denote a number of streams (or DM RS) assigned to SS 116 according to this method where n=5,6,7,8. Then, one DM RS index set is chosen for each n=5,6,7,8 to reduce signaling overhead associated with this method of using the rank-8 DM RS pattern 440, 450. A group A includes these four DM RS index sets in a rank-8 DM RS pattern 440, 450 (or four states) constructed by this restriction method.

This restriction method is based on the fact that a rank-8 DM RS pattern 440, 450 assigns smaller number of DM RS symbols for each stream (or each layer) than the other DM RS patterns, and hence channel estimation performance is degraded especially for low SNR SSs. As those low SNR SSs are usually scheduled with small number of streams by BS 102, the usage of a rank-8 pattern 440, 450 is restricted to those low SNR SSs receiving less than 5 streams. In addition, the usage of a rank-8 pattern 440, 450 only is restricted for single-user high-rank transmissions.

In one example, group A is constructed with four states. For each n=5, 6, 7 or 8, a rank-n DM RS index set is chosen in a rank-8 pattern 440, 450, which has n elements comprising n smallest DM RS indices in the rank-8 pattern 440, 450. If we follow the method of choosing an index set in this example, a rank-5, a rank-6, a rank-7 and a rank-8 DM RS index sets will be {4,5,6,7,8}, {4,5,6,7,8,9}, {4,5,6,7,8,9,10} and {4,5,6,7,8,9,10}, respectively (correspondingly States 18, 19, 20, 21).

Figure 8:
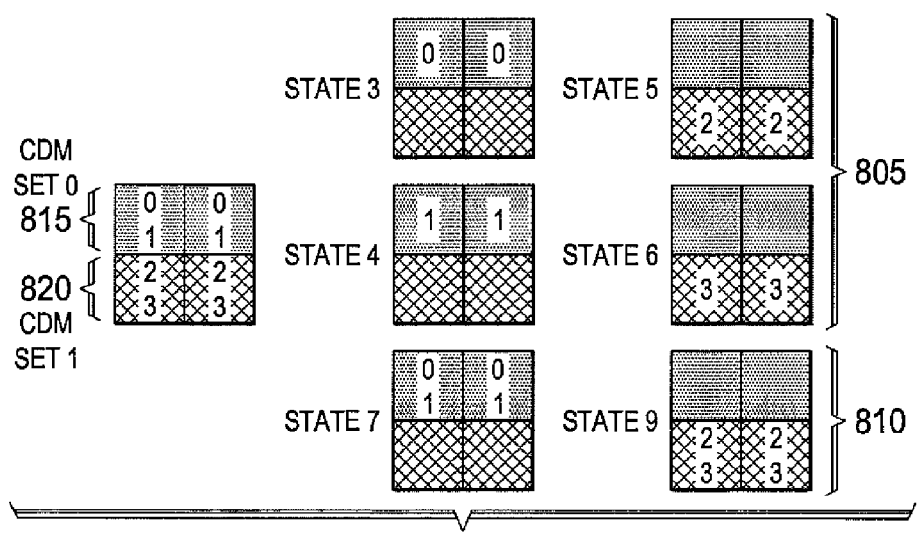
FIG. 8 illustrates states related to each CDM set in a Rank 4 pattern according to embodiments of the present disclosure.

FIG. 8 illustrates states related to each CDM set in a Rank 4 pattern according to embodiments of the present disclosure. The embodiment shown in FIG. 8 is for illustration only. Other embodiments could be used without departing from the scope of this disclosure.

In the example shown in FIG. 8, a rank-4 DM RS pattern is selected for DL transmission in an RB. When BS 102 assigns 1 stream (and DM RS) to SS 116, any of the four rank-1 index sets, or, {0}, {1}, {2} and {3} (correspondingly States 3,4,5, 6), can be assigned to SS 116. A group B-1 805 includes these four DM RS index sets in a rank-4 DM RS pattern (or four states) constructed by this restriction method.

When BS 102 assigns 2 streams to SS 116, only two index sets are allowed to be signaled to SS 116, to reduce the number of states involved in the DL grant signaling. Here, the two index sets can be obtained from a non-overlapping partition of an index set {0, 1, 2, 3} into 2-element sets. In one example, the two index sets are chosen such that two DM RS associated with one index set are CDM'ed in one set of REs; in this case, the two index sets are {0,1} and {2,3} for a rank-4 pattern 420 (or States 7, 9). In another example, the two DM RS index sets are {1,2} and {3,0} for a rank-4 pattern 420 (or States 8,10). A group B-2 810 includes these two DM RS index sets in a rank-4 DM RS pattern 420 (or two states) constructed by this restriction method.

The states associated with groups B-1 and B-2 are illustrated in FIG. 8. The refer to a set of RS REs multiplexing DM RS 0 and 1 as CDM set 0 815, while another set of RS REs multiplexing DM RS 2 and 3 as CDM set 1 820.

A 3-bit bitmap signaling can be considered for signaling of states in FIG. 8. The MSB of the 3 bits indicates either of the CDM sets, the two LSBs of the 3 bits indicate bitmap of assigned antenna ports within a selected CDM set.

When BS 102 assigns 3 or 4 streams to SS 116, one index set is allowed for 3-stream case, and another index set for 4-stream case to be signaled to SS 116. Again, this restriction is targeted for signaling overhead reduction. In the case of 4-stream transmission, there is only one associated index set in a rank-4 pattern 420, which is {0, 1, 2, 3} (or State 14). Alternatively, the one rank-3 DM RS set is chosen from 4 different DM RS index sets, {0,1,2}, {1,2,3}, {2,3,0}, {3,0, 1}. In one example, the one rank-3 DM RS index set is composed of 3 smallest DM RS indices in the rank-4 pattern 420, which is {0,1,2} for a rank-4 pattern 420 (or State 14). In a second example, the one rank-3 DM RS index set is composed of 3 DM RS indices avoiding either DM RS 0 or DM RS 1 in the rank-4 pattern 420, which is {1,2,3}, or {0,2,3} for a rank-4 pattern 420 (or State 15). A group B-3 includes these two DM RS index sets in a rank-4 DM RS pattern (or two states) constructed by this restriction method.

When one rank-3 DM RS index set is {1,2,3} or {0,2,3} as in example 2, BS 102 may be able to multiplex an advanced UE, such as SS 116, and a legacy UE, such as SS 112, together. Here, SS 116 (an advanced UE) knows Rank-4 pattern 420, while SS 112 (a legacy UE) knows Rank-2 pattern A 400 but SS 112 does not know Rank-4 pattern 420. In this case, the DM RS indices that SS 112 knows are only 0 and 1. Even in this case, BS 102 can multiplex streams for SS 112 and SS 116 in an RB, by assigning streams (and DM RS) 1, 2, 3 to SS 116 and stream (and DM RS) 0 to SS 112. This would have not been possible if the one rank-3 DM RS index set is {0,1,2}, as both 0 and 1 are occupied by SS 116 receiving 3 streams.

Figure 9A:
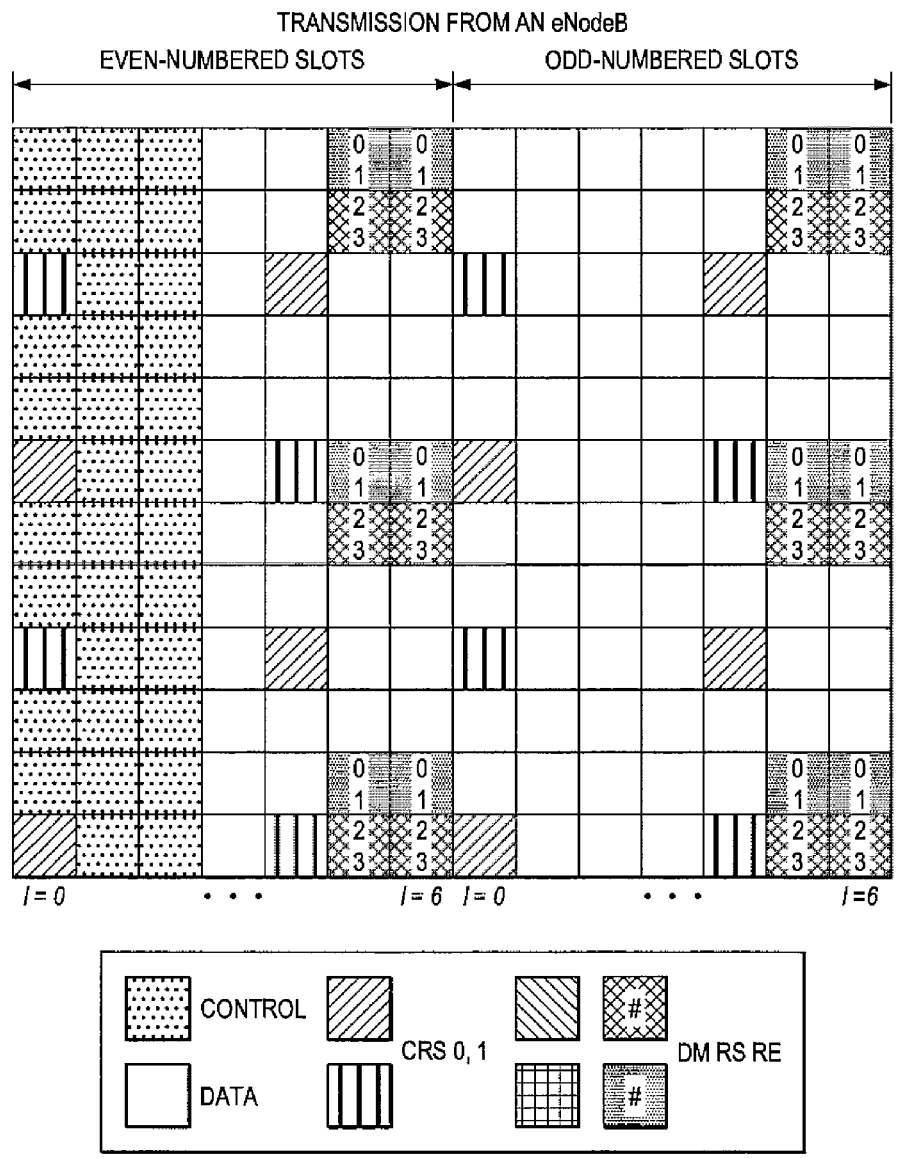

FIGS. 9A and 9B illustrate perceived resource mapping at a legacy subscriber station and an advanced subscriber station according to embodiments of the present disclosure. The embodiment shown in FIGS. 9A and 9B is for illustration only. Other embodiments could be used without departing from the scope of this disclosure.

In the example shown in FIGS. 9A and 9B, perceptions of resource mapping at different type of SSs with a MU-MIMO scheduling are illustrated. BS 102 gives stream 0 905 (and DM RS 0 in Rank-2 pattern A 400) to a SS 112, while BS 102 gives stream 1, 2, 3 (and DM RS 1, 2, 3 in Rank-4 pattern 420)

to SS 116. SS 112 receives stream 0 and demodulate data signals without knowing the existence of the other set of RS REs.

This restriction method for a rank-4 pattern 420 targets a flexible multi-user scheduling while maintaining the number of states (or DM RS index sets) small. In system-level simulations performed for ITU-R evaluation for IMT-advanced, the chances where SS 116 has a high rank is small when SS 116 is multiplexed with another SS. Hence, the flexibility of multi-user scheduling for lower ranks (ranks 1 and 2) is maintained while a minimum set of DM RS index sets for higher ranks (ranks 3 and 4) is provided. As a results, four states are provided for representing rank 1 case (group B-1 805), two states for representing rank2 case (group B-2 810), one state each for representing rank 3 and rank 4 (group B-3). This way, when an BS 102 multiplex multiple subscriber station signals in an RB, BS 102 has some freedom to assign the multiple SSs each with small number of streams. In one example, BS 102 multiplexes four SSs with one stream each, by indicating each of the four states in group B-1 805. In another example, BS 102 multiplexes three SSs, such as SS 111, SS 115 and SS 116, with two streams for SS 111, one stream for SS 115, and one stream for SS 116, by indicating {0} and {1} in group B-1 805 to SS 111 and SS 115, and by indicating {2,3} in group B-2 810 to SS 116.

In some embodiments, Rank-2 DM RS pattern A 400 is selected for DL transmission in an RB. Then, BS 102 can assign any of the index sets defined for the pattern, that is, {0}, {1}, {0,1} (or States 0, 1 and 2). Group C-1 includes States 0, 1 and 2.

In some embodiments, Rank-2 DM RS pattern B 405 is selected for DL transmission in an RB. Then, BS 102 can assign any of the index sets defined for the pattern, that is, {2}, {3}, {2,3} (or States 273, 274 and 275). Group C-2 includes states 273, 274 and 275.

Rank-2 DM RS pattern A 400 and B 405 include smaller number of DM RS REs allocated than rank-4 420 and rank-8 patterns 440, 450; therefore, BS 102 may allocate more data REs in RBs. As the number of streams that can be multiplexed within Rank-2 DM RS patterns 400, 405 are small, the SSs scheduled a rank-2 DM RS pattern 400, 405 have the full flexibility of assigning DM RS indices.

In one embodiment, a restricted subset comprises states from at least one group among groups A, B-1 805, B-2 810, B-3, C-1 and C-2. Depending upon DM RS patterns that BS implements and an additional signaling overhead that BS 102 is willing to pay, BS 102 can choose which groups of states to include in the DL grant signaling.

In one example, BS 102 implements Rank-2 pattern A 400, Rank-4 pattern 420 and Rank-8 pattern A 440. In this case, a restricted subset may include states in groups A, B-1 805, B-2 810, B-3 and C-1. A restricted subset comprising groups A, B-1 805, B-2 810, B-3 and C-1 is called restricted subset A, and has Ns=15 states.

In another example, BS 102 implements Rank-2 pattern B 405, Rank-4 pattern 420 and Rank-8 pattern A 440. In this case, a restricted subset may comprise states in groups A, B-1 805, B-2 810, B-3 and C-2. A restricted subset comprising groups A, B-1 805, B-2 810, B-3 and C-2 is called restricted subset B and has Ns=15 states.

In another example, BS 102 implements Rank-4 pattern 420 and Rank-8 pattern A 440. In this case, a restricted subset may comprise states in groups A, B-1 805, B-2 810, and B-3. A restricted subset comprising groups A, B-1 805, B-2 810 and B-3 is called restricted subset C and has Ns=12 states.

In another example, BS 102 implements Rank-2 pattern A 400 and Rank-2 pattern B 405. In this case, a restricted subset may comprise states in groups C-1 and C-2. A restricted subset comprising group C-1 and C-2 is called restricted subset D and has Ns=6 states.

In another example, BS 102 implements Rank-4 pattern 420. In this case, a restricted subset may comprise states in groups B-1 805, B-2 810 and B-3. A restricted subset comprising groups B-1 805, B-2 810 and B-3 is called restricted subset E and has Ns=8 states.

In another example, BS 102 implements Rank-4 pattern 420, Rank-2 patterns A 400 and Rank-2 pattern B 405. In this case, a restricted subset may comprise states in groups B-1 805, B-2 810, B-3, C-1 and C-2. A restricted subset comprising groups B-1 805, B-2 810, B-3, C-1 and C-2 is called restricted subset F and has Ns=14 states.

Example constructions of restricted subsets A through F are summarized in Table 5. In Table 5, the DM RS index sets are listed in each row corresponding to a restricted subset.

TABLE 5

Example constructions of restricted subsets A through F

| | Rank-2 pattern A | Rank-2 Pattern B | Rank-4 pattern | Rank-8 pattern A or B |
|---|---|---|---|---|
| restricted subset A | {0}, {1}, {0, 1} | | {0}, {1}, {2}, {3}, {0, 1}, {2, 3} {1, 2, 3} {0, 1, 2, 3} | {4, 5, 6, 7, 8} {4, 5, 6, 7, 8, 9} {4, 5, 6, 7, 8, 9, 10} {4, 5, 6, 7, 8, 9, 10, 11} |
| restricted subset B | | {2}, {3}, {2, 3} | {0}, {1}, {2}, {3}, {0, 1}, {2, 3} {1, 2, 3} {0, 1, 2, 3} | {4, 5, 6, 7, 8} {4, 5, 6, 7, 8, 9} {4, 5, 6, 7, 8, 9, 10} {4, 5, 6, 7, 8, 9, 10, 11} |
| restricted subset C | | | {0}, {1}, {2}, {3}, {0, 1}, {2, 3} {1, 2, 3} {0, 1, 2, 3} | {4, 5, 6, 7, 8} {4, 5, 6, 7, 8, 9} {4, 5, 6, 7, 8, 9, 10} {4, 5, 6, 7, 8, 9, 10, 11} |
| restricted subset D | {0}, {1}, {0, 1} | {2}, {3}, {2, 3} | | |
| restricted subset E | | | {0}, {1}, {2}, {3}, {0, 1}, {2, 3} {1, 2, 3} {0, 1, 2, 3} | |
| restricted subset F | {0}, {1}, {0, 1} | {2}, {3}, {2, 3} | {0}, {1}, {2}, {3}, {0, 1}, {2, 3} {1, 2, 3} {0, 1, 2, 3} | |

In some embodiments, BS 102 informs SS 116 a restricted subset via higher-layer signaling. The information of a restricted subset can be implicitly conveyed in a selected set of DM RS patterns or a transmission mode, which are carried in higher-layer signaling.

In one example, BS 102 informs SS 116 that a set of possible DM RS patterns are Rank-4 pattern 420 and Rank-8 pattern A 440, via a higher-layer signaling. Then the set of possible DM RS patterns implies that a restricted subset SS 116 needs to assume when receiving a DL grant is restricted subset C.

In another example, BS 102 informs SS 116 of a transmission mode where Rank-2 pattern A 400, Rank-4 pattern 420 and Rank-8 pattern A 440 are supported. Then the configuration of the transmission mode at SS 116 implies that a restricted subset the UE needs to assume when receiving a DL grant is restricted subset A.

In one embodiment, one state among states in a restricted subset is dynamically signaled in a DL grant in a DCI format via PDCCH. As a state implies a selected DM RS pattern and a DM RS index set from the selected DM RS pattern, various methods of conveying the state in codepoints of a DCI format can be utilized.

In some embodiments, a new DCI format is constructed extending from an existing DCI format, by adding Nb bits to the existing DCI format to provide sufficient codepoints for states in a restricted subset having Ns states, where Nb is $\lceil \log_2 N_S \rceil$ bits. Ns states are one-to-one mapped to Ns codepoints among $2^{Nb}$ newly inserted codepoints.

In one example, for restricted subset E with Ns=8, a new DCI format is constructed from an existing DCI formats, e.g., LTE Rel-8 DCI formats, with adding Nb=$\lceil \log_2 8 \rceil$=3 bits. One example one-to-one mapping from the Ns=8 states to the 8 codepoints generated by Nb=3 bits is:

TABLE 6

| State of the Nb bits | Indicated DM RS index set |
|---|---|
| 001 | {0} in the Rank-4 pattern |
| 010 | {1} in the Rank-4 pattern |
| 011 | {0,1} in the Rank-4 pattern |
| 101 | {2} in the Rank-4 pattern |
| 110 | {3} in the Rank-4 pattern |
| 111 | {2, 3} in the Rank-4 pattern |
| 000 | {1, 2, 3} in the Rank-4 pattern |
| 100 | {0, 1, 2, 3} in the Rank-4 pattern |

Other than 000 and 100, 3-bit bitmap indication for FIG. 8 has been applied for mapping DM RS index sets onto states of the Nb bits.

In some embodiments, a new DCI format is constructed extending from an existing DCI format, by adding N1 bits for pattern selection and N2 bit for indication of DM RS index set to the existing DCI format, to provide sufficient codepoints for states in a restricted subset having Ns states. In this case, N1 is $\lceil \log_2 N_P \rceil$ bits, where Np is a number of DM RS patterns that a restricted subset can describe; N2 is $\lceil \log_2 N_S \rceil - \lceil \log_2 N_P \rceil$ bits. Np DM RS patterns are mapped to $2^{Nb}$ newly inserted codepoints. Furthermore, together with a codepoint from the N1 bits, the remaining N2 bits will determine a state in a restricted subset.

Figure 10:
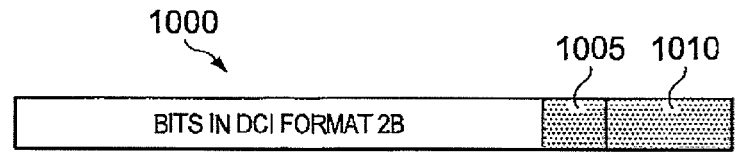
FIG. 10 illustrates a DCI format 2B according to embodiments of the present disclosure.

FIG. 10 illustrates a DCI format 2B according to embodiments of the present disclosure. The embodiment of the DCI format 2B 1000 shown in FIG. 10 is for illustration only. Other embodiments could be used without departing from the scope of this disclosure.

In the example shown in FIG. 10, N1 and N2 bits are added to DCI format 2B. A first bit, N1, 1005 is configured to indicate the DM RS pattern selection. A second bit, N2, 1010 is configured to indicate the DM RS index set.

In one example of indicating Ns=12 states in restricted subset C which are for Rank-4 pattern 420 and either of Rank-8 patterns A 440 and B 450, d N1=$\lceil \log_2 2 \rceil$=1 bit and N2=$\lceil \log_2 12 \rceil - 1$=3 bits are added to a DCI format. Table 7 describes example mapping of the 12 states to the codepoints generated by N1+N2 bits:

TABLE 7

N1 = 1 bit determining the DM RS pattern

| The selected bit | 0 | 1 |
|---|---|---|
| Indicated DM RS pattern | the Rank-4 pattern | the Rank-8 pattern |

N2=3 bits determining an index set within the selected DM RS pattern selected by the N1 bit.

If the Rank-4 pattern is selected by the one bit, one example method of mapping the 8 associated states to 8 codepoints is illustrated in Table 8:

TABLE 8

| Selected bits | Indicated DM RS index set |
|---|---|
| 001 | {0} in the Rank-4 pattern |
| 010 | {1} in the Rank-4 pattern |
| 011 | {0, 1} in the Rank-4 pattern |
| 101 | {2} in the Rank-4 pattern |
| 110 | {3} in the Rank-4 pattern |
| 111 | {2, 3} in the Rank-4 pattern |
| 000 | {1, 2, 3} in the Rank-4 pattern |
| 100 | {0, 1, 2, 3} in the Rank-4 pattern |

Other than 000 and 100, 3-bit bitmap indication for FIG. 8 has been applied for mapping DM RS index sets onto states of the Nb bits.

If the Rank-8 pattern 440, 450 is selected by the one bit, one example method of mapping the 4 associated states to 4 codepoints illustrated in Table 9:

TABLE 9

| Selected bits | Indicated DM RS index set |
|---|---|
| 000 | {4, 5, 6, 7, 8} in the Rank-8 pattern |
| 001 | {4, 5, 6, 7, 8, 9} in the Rank-8 pattern |
| 010 | {4, 5, 6, 7, 8, 9, 10} in the Rank-8 pattern |
| 011 | {4, 5, 6, 7, 8, 9, 10, 11} in the Rank-8 pattern |
| 100 | reserved |
| 101 | reserved |
| 110 | reserved |
| 111 | reserved |

In one example of indicating Ns=15 states in restricted subset A which are for Rank-2 pattern A 405, Rank-4 pattern 420 and either of Rank-8 patterns A 440 and B 450, N1=$\lceil \log_2 3 \rceil$=2 bit and N2=$\lceil \log_2 15 \rceil - 1$=2 bits are added to a DCI format. Tables 9-13 describes example mapping of the 15 states to the codepoints generated by N1+N2 bits are described below. In addition, similar mapping can be used for restricted subset B as well.

N1=2 bits (DM RS pattern selector field) determining the DM RS pattern:

TABLE 9

| Selected bits | 00 | 01 | 10 | 11 |
|---|---|---|---|---|
| Indicated DM RS pattern | Rank-2 pattern A | the Rank-8 pattern | the Rank-4 pattern | the Rank-4 pattern |

N2=2 bits (DM RS index set field) determining an index set within the selected DM RS pattern selected by the one bit.

If the Rank-8 pattern 440, 450 is selected by the N1 bits, one example method of mapping the 4 associated states to 4 codepoints is:

TABLE 10

| Selected bits in DM RS index set field | Indicated DM RS index set |
|---|---|
| 00 | {4, 5, 6, 7, 8} in the Rank-8 pattern |
| 01 | {4, 5, 6, 7, 8, 9} in the Rank-8 pattern |

TABLE 10-continued

| Selected bits in DM RS index set field | Indicated DM RS index set |
|---|---|
| 10 | {4, 5, 6, 7, 8, 9, 10} in the Rank-8 pattern |
| 11 | {4, 5, 6, 7, 8, 9, 10, 11} in the Rank-8 pattern |

If the Rank-2 pattern 400, 405 is selected by the N1 bits, one example method of mapping the 3 associated states to 3 codepoints is:

TABLE 11

| Selected bits in DM RS index set field | Indicated DM RS index set |
|---|---|
| 00 | {0} in the Rank-2 pattern |
| 01 | {1} in the Rank-2 pattern |
| 10 | {0, 1} in the Rank-2 pattern |
| 11 | Reserved |

If the Rank-4 pattern 420 is selected by the N1 bits=10, one example method of mapping the 4 associated states to 4 codepoints is

TABLE 12

| Selected bits in DM RS index set field | Indicated DM RS index set |
|---|---|
| 01 | {0} in the Rank-4 pattern |
| 10 | {1} in the Rank-4 pattern |
| 11 | {0, 1} in the Rank-4 pattern |
| 00 | {1, 2, 3} in the Rank-4 pattern |

The two bits in the DM RS index set field are a bitmap for indicating the assigned DM RS among the 2 DM RS in CDM set 0 815 (discussed with reference to FIG. 8), except for 00. 00 indicates one rank-3 index set among the 4 possible rank-3 index sets.

If the Rank-4 pattern is selected by the N1 bits=11, one example method of mapping the 4 associated states to 4 codepoints is:

TABLE 13

| Selected bits in DM RS index set field | Indicated DM RS index set |
|---|---|
| 01 | {2} in the Rank-4 pattern |
| 10 | {3} in the Rank-4 pattern |
| 11 | {2, 3} in the Rank-4 pattern |
| 00 | {0, 1, 2, 3} in the Rank-4 pattern |

The two bits in the DM RS index set field are a bitmap for indicating the assigned DM RS among the 2 DM RS in CDM set 1 820, except for 00. 00 indicates the rank-4 index set.

Figure 11:
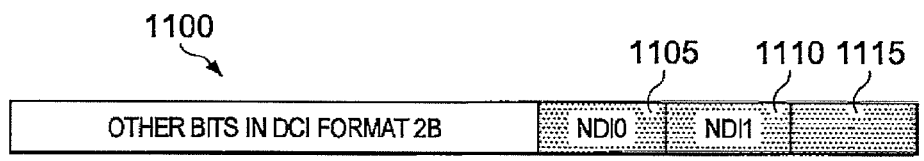
FIG. 11 illustrates a DCI format 2C according to embodiments of the present disclosure.

FIG. 11 illustrates a DCI format 2C according to embodiments of the present disclosure. The embodiment of the DCI format 2C 1100 shown in FIG. 11 is for illustration only. Other embodiments could be used without departing from the scope of this disclosure.

In the example shown in FIG. 11, the new DCI format 1100 is constructed extending from an existing DCI format. The new DCI format 1100 includes N3 bits configured to indicate a combination of a selected DM RS pattern and a DM RS index set. For example, the new DCI format 1100 includes N3 bits 1115 configured to indicate a combination of a selected DM RS pattern and a DM RS index set added to DCI format 2B 1000. The additional N3 bits 1115 configured and a DM RS index set provide sufficient codepoints for states in a restricted subset having Ns states. An NDI bit of a disabled transport block (TB) in DCI format 2B is used for indicating a DM RS index in the case of rank-1 indication in Rel-9 LTE. Hence, a codepoint constructed by a combination of an NDI bit of a disabled TB and the N3 bits 1115 is used for indicating rank-1 states in the restricted subset.

The number of states for rank-1 index sets in a restricted subset is $N_{S1}$. In addition, N3 is $\lceil \log_2(N_S - N_{S1}) \rceil$ bits. Further, $(N_S - N_{S1})$ states for index sets having more than one index (or index sets in a restricted subset excluding rank-1 index sets) are mapped to $2^{N3}$ newly inserted codepoints. Then, a rank-1 index set is indicated by a codepoint of a combination of an NDI bit of a disabled TB and a rank-2 state in the N3 bits 1115, where the rank-1 index set is a subset of the rank-2 index set represented by the rank-2 state.

One example mapping of the Ns=12 states in restricted subset C to codepoints in DCI format 2C 1100 according to the method described in this embodiment is as follows:

TABLE 14

| NDI bit of a disabled TB, if any | Selected bits in the new N3-bit field | Indicated DM RS index set |
|---|---|---|
| 0 | 000 | {0} in the Rank-4 pattern |
| 1 | | {1} in the Rank-4 pattern |
| No disabled TBs | | {0, 1} in the Rank-4 pattern |
| 0 | 001 | {2} in the Rank-4 pattern |
| 1 | | {3} in the Rank-4 pattern |
| No disabled TBs | | {2, 3} in the Rank-4 pattern |
| No disabled TBs | 010 | {1, 2, 3} in the Rank-4 pattern |
| No disabled TBs | 011 | {0, 1, 2, 3} in the Rank-4 pattern |
| No disabled TBs | 100 | {4, 5, 6, 7, 8} in the Rank-8 pattern |
| No disabled TBs | 101 | {4, 5, 6, 7, 8, 9} in the Rank-8 pattern |
| No disabled TBs | 110 | {4, 5, 6, 7, 8, 9, 10} in the Rank-8 pattern |
| No disabled TBs | 111 | {4, 5, 6, 7, 8, 9, 10, 11} in the Rank-8 pattern |

One example mapping of the Ns=8 states in restricted subset E to codepoints in DCI format 2C 1100 according to the method described in this embodiment is as follows:

TABLE 15

| NDI bit of a disabled TB, if any | Selected bits in the new 2-bit field | Indicated DM RS index set |
|---|---|---|
| 0 | 00 | {0} in the Rank-4 pattern |
| 1 | | {1} in the Rank-4 pattern |
| No disabled TBs | | {0, 1} in the Rank-4 pattern |
| 0 | 01 | {2} in the Rank-4 pattern |
| 1 | | {3} in the Rank-4 pattern |
| No disabled TBs | | {2, 3} in the Rank-4 pattern |
| No disabled TBs | 10 | {1, 2, 3} in the Rank-4 pattern |
| No disabled TBs | 11 | {0, 1, 2, 3} in the Rank-4 pattern |

One example mapping of the 14 states in restricted subset F to codepoints in DCI format 2C 1100 to the method described in this embodiment is as follows:

TABLE 16

| NDI bit of a disabled TB, if any | Selected bits in the new 3-bit field | Indicated DM RS index set |
|---|---|---|
| 0 | 000 | {0} in Rank-4 Pattern |
| 1 | | {1} in Rank-4 Pattern |
| No disabled TBs | | {0,1} in Rank-4 Pattern |

TABLE 16-continued

| NDI bit of a disabled TB, if any | Selected bits in the new 3-bit field | Indicated DM RS index set |
|---|---|---|
| 0 | 001 | {2} in Rank-4 Pattern |
| 1 | | {3} in Rank-4 Pattern |
| No disabled TBs | | {2, 3} in Rank-4 Pattern |
| 0 | 010 | {0} in Rank-2 Pattern A |
| 1 | | {1} in Rank-2 Pattern A |
| No disabled TBs | | {0, 1} in Rank-2 Pattern A |
| 0 | 011 | {2} in Rank-2 Pattern B |
| 1 | | {3} in Rank-2 Pattern B |
| No disabled TBs | | {2, 3} in Rank-2 Pattern B |
| No disabled TBs | 100 | {1, 2, 3} in the Rank-4 pattern |
| No disabled TBs | 101 | {0, 1, 2, 3} in the Rank-4 pattern |
| Don't Care | 110/111 | Reserved |

One example mapping of the Ns=6 states in restricted subset D to codepoints in DCI format 2C 1100 according to the method described in this embodiment is as follows:

TABLE 17

| NDI bit of a disabled TB | Selected bits in the new 1-bit field | Indicated DM RS index set |
|---|---|---|
| 0 | 000 | {0} in Rank-2 Pattern A |
| 1 | | {1} in Rank-2 Pattern A |
| No disabled TBs | | {0, 1} in Rank-2 Pattern A |
| 0 | 001 | {2} in Rank-2 Pattern B |
| 1 | | {3} in Rank-2 Pattern B |
| No disabled TBs | | {2, 3} in Rank-2 Pattern B |

In some embodiments, the wireless network 100 is a heterogeneous network that includes multiple categories of base stations (eNodeBs) deployed in a same geographical area, for serving subscriber stations. One type of BS is a macro base station, which transmits signals with a relatively large power and hence has a wider cell coverage. Other types of base stations are non-macros base stations, which can include home eNodeBs (HeNBs), pico eNodeB (picos), femto eNodeBs (femtos), closed-subscriber-group eNodeBs (CSGs). These types of base stations transmit signals with a relatively low power and hence have narrower cell coverages than macros Cell planning is used to determine placement of the macro base stations. Locations and cell-specific reference signals (CRSs) of macros are pre-arranged so that closest neighbor macros can suppress inter-macro (or inter-cell) interference. For example, Rel-8 LTE provides three orthogonal sets of CRS resources in the OFDM time-frequency grid of a subframe (or 1 msec), so that the network assign CRS from three closest neighbor cells to occupy three different (orthogonal) time-frequency resources. Furthermore, Rel-8 LTE relates a physical cell-id (PCI) directly to a CRS resource, and hence the network only needs to assign cell-ids appropriately for neighbor macros for the CRS interference management.

Alternatively, non-macros can be placed after macros are placed, and sometimes the non-macro base stations are placed within a coverage area of one or more of macro base stations. Furthermore, some non-macros are placed by individuals, not by network, making cell-planning difficult. In some cases, a type of self-organizing network (SON) technology is used, and non-macros are given cell-ids and CRSs that could result in minimal inter-cell interference to an existing network. However, when the number of orthogonal CRS resources is limited and a large number of non-macros are placed in the coverage of a macro, aforementioned type of technology may not be able to resolve inter-cell interference issue successfully. R1-100681, "*Further details on CSI-RS*," Qualcomm Inc, 3GPP RAN1#59bis, January 2010, the contents of which are incorporated by reference, allows for partial overlap of CSI-RS from multiple cells for inter-cell CSI-RS mapping in heterogeneous networks. However, this may not be a complete solution, as a well-established cell-planning method relying on orthogonal cell-specific RS pattern cannot be utilized.

Embodiments of the present disclosure provide dynamic signaling methods for DM-RS port allocation allowing that (1) RBs in a subframe can have different DM RS patterns, and that (2) multiple subscriber stations can be scheduled within a same RB, each with a different number of layers.

From Rank-2 patterns A 400 and B 405, Rank-4 pattern 420 and either one of the Rank-8 patterns 440, 450, a total number of all the possible states, where each state conveys information on a combination of a selected DM RS pattern and a DM RS index set within the selected DM RS pattern, is 3(Rank-2 patterns)+15(Rank-4 pattern)+255(rank-8 patterns)=273. Since 273 states can be too many to be indicated in a dynamic downlink grant, embodiments of the present disclosure provide various methods (denoted by subset restriction methods) of reducing states by selecting a subset of 273 states.

In a first method for reducing states (hereinafter referred to as "MU-MIMO indication method 1"), the rank patterns are used to indicate different states. For example, a Rank-2 patter 400, 405 is used for both SU-MIMO and MU-MIMO, which implies that a DM RS port indication assigns one state out of {0}, {1}, {0,1}. A Rank-4 pattern 420 can be used for both SU-MIMO and MU-MIMO. This would include all the rank-1 states, {0}, {1}, {2} and {3}; include two rank-2 states, e.g., {0, 1}, {2, 3}; include only one rank-3 state, e.g., {1, 2, 3}; and include only one rank-4 state, i.e., {0, 1, 2, 3}. Further, if a Rank-8 pattern 440, 450 is supported (e.g., if an 8-Tx eNodeB is used), a Rank-8 pattern 440, 450 is used only for SU-MIMO, which implies that a DM RS port indication would assign at least five streams to SS 116 when a Rank-8 440, 450 pattern is used. Here, included are four states corresponding to rank 5, rank 6, rank 7 and rank 8.

In another method for reducing states (hereinafter referred to as "MU-MIMO indication method 2"): a Rank-2 pattern 400, 405 is used for both SU-MIMO and MU-MIMO, which implies that a DM RS port indication would assign one state out of {0}, {1}, {0,1}; a Rank-4 pattern 420 is used only for SU-MIMO, wherein included are only one rank-3 state, e.g., {1, 2, 3} and only one rank-4 state, i.e., {0, 1, 2, 3}. In addition, if Rank-8 pattern 440, 450 is supported (e.g., if an 8-Tx eNodeB is used), a Rank-8 pattern 440, 450 is used only for SU-MIMO, which implies that a DM RS port indication would assign at least five streams to SS 116 when a Rank-8 pattern is used. Here, included are four states corresponding to rank 5, rank 6, rank 7 and rank 8.

Given a subset restriction method, embodiments of the present disclosure provide methods to construct a DCI format for SU-/MU-MIMO signaling. The new DCI formats are constructed by extending from an existing DCI format as illustrated in FIGS. 10 and 11.

In a 3GPP RAN1#60 "*Discussion on Layer to DMRS mapping*," Samsung, February 2010, the contents of which are hereby incorporated in its entirety, a layer to DMRS port mapping method is proposed when the transmission rank is at least 3, as shown in Table 18:

TABLE 18

An example Layer to DM RS port mapping

| Transmission Rank | Layer to DMRS port mapping |
|---|---|
| Rank 3 | L0 on the top CDM set in Rank-4 pattern |
|  | L1, L2 on the bottom CDM set in Rank-4 pattern |
| Rank 4 | L0, L1 on the top CDM set in Rank-4 pattern |
|  | L2, L3 on the bottom CDM set in Rank-4 pattern |
| Rank 5 | L0, L1 on the top CDM set in Rank-8 pattern |
|  | L2, L3, L4 on the bottom CDM set in Rank-8 pattern |
| Rank 6 | L0, L1, L2 on the top CDM set in Rank-8 pattern |
|  | L3, L4, L5 on the bottom CDM set in Rank-8 pattern |
| Rank 7 | L0, L1, L2 on the top CDM set in Rank-8 pattern |
|  | L3, L4, L5, L6 on the bottom CDM set in Rank-8 pattern |
| Rank 8 | L0, L1, L2, L3 on the top CDM set in Rank-8 pattern |
|  | L4, L5, L6, L7 on the bottom CDM set in Rank-8 pattern |

Figure 12:
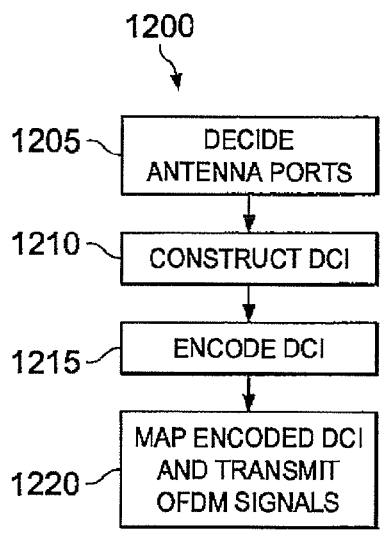
FIG. 12 illustrates a DM-RS antenna port indication process according to embodiments of the present disclosure.
Figure 13:
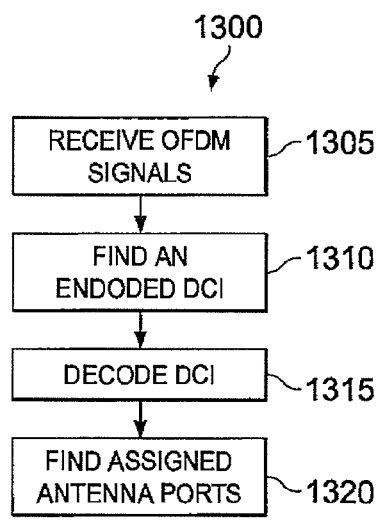
FIG. 13 illustrates a DM-RS antenna port reception process according to embodiments of the present disclosure.

FIG. 12 illustrates a DM-RS antenna port indication process according to embodiments of the present disclosure. FIG. 13 illustrates a DM-RS antenna port reception process according to embodiments of the present disclosure. The embodiment of the indication process 1200 and reception process 1300 shown in FIGS. 12 and 13 are for illustration only. Other embodiments could be used without departing from the scope of this disclosure.

In block 1205, BS 102 decides which antenna port is to be used for SS 116. BS 102 constructs a DCI including the antenna port information for SS 116 in block 1210. BS 102 encodes the DCI in block 1215. In block 1220, maps the encoded DCI to physical resources and transmits OFDM signals.

In block 1305, SS 116 receives OFDM signals from BS 102. SS 116 finds the encoded DCI intended for SS 116 in the OFDM signals in block 1310. In block 1315, SS 116 decodes the DCI and, in block 1320, SS 116 finds the assigned antenna ports to be used for SS 116 by reading the DCI.

Embodiments of the present disclosure provide methods for constructing the DCI, which includes antenna port (AP) indices assigned for SS 116 in one or more downlink transmissions (e.g., block 1210 in FIG. 12). Embodiments of the present disclosure also provide methods for a subscriber station to find the antenna port indices from the DCI.

Figure 14:
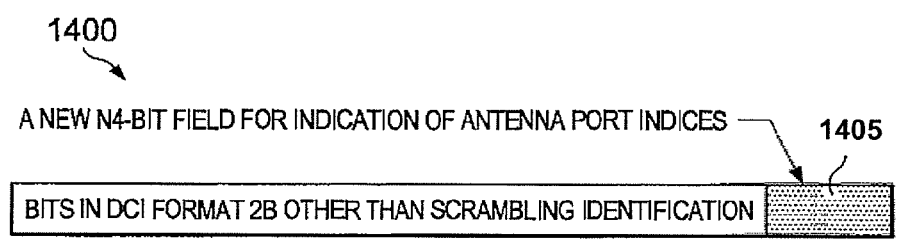
FIG. 14 illustrates another DCI format 2C according to embodiments of the present disclosure.

FIG. 14 illustrates a DCI format 2C according to embodiments of the present disclosure. The embodiment of the DCI format 2C 1400 shown in FIG. 14 is for illustration only. Other embodiments could be used without departing from the scope of this disclosure.

DCI format 2C 1400 is constructed by modifying DCI format 2B for granting one or more downlink transmissions for at least one subscriber station. Here, the modification includes removing one information element of scrambling identity, and adding a new N4-bit information element 1405. The new N4-bit information element 1405 is used for indicating AP indices for the one or more downlink transmissions, and is called "antenna port indication."

In this case, DCI format 2C would be described as in the following:

The following information is transmitted by means of the DCI format 2C:
  Resource allocation header (resource allocation type 0/type 1)—1 bit as defined in section 7.1.6 of 3GPP TS 36.213 v 9.0.1, "*E-UTRA, Physical Layer Procedures*", December 2009, the contents of which are hereby incorporated by reference in their entirety.
  If downlink bandwidth is less than or equal to 10 PRBs, there is no resource allocation header and resource allocation type 0 is assumed.
  Resource block assignment:
    For resource allocation type 0 as defined in section 7.1.6.1 of *E-UTRA, Physical Layer Procedures*
    $\lceil N_{RB}^{DL}/P \rceil$ bits provide the resource allocation
    For resource allocation type 1 as defined in section 7.1.6.2 of *E-UTRA, Physical Layer Procedures*
    $\lceil \log_2(P) \rceil$ bits of this field are used as a header specific to this resource allocation type to indicate the selected resource blocks subset
    1 bit indicates a shift of the resource allocation span
    $(\lceil N_{RB}^{DL}/P \rceil - \lceil \log_2(P) \rceil - 1)$ bits provide the resource allocation
    where the value of P depends on the number of DL resource blocks as indicated in section 7.1.6.1 of *E-UTRA, Physical Layer Procedures*.
  TPC command for PUCCH—2 bits as defined in section 5.1.2.1 of *E-UTRA, Physical Layer Procedures*.
  Downlink Assignment Index (this field is present in TDD for all the uplink-downlink configurations and only applies to TDD operation with uplink-downlink configuration 1-6. This field is not present in FDD)—2 bits.
  HARQ process number—3 bits (FDD), 4 bits (TDD).
  Antenna port indication—N4 bits.
  In addition, for transport block 1:
  Modulation and coding scheme—5 bits as defined in section 7.1.7 of *E-UTRA, Physical Layer Procedures*.
  New data indicator—1 bit
  Redundancy version—2 bits
  In addition, for transport block 2:
  Modulation and coding scheme—5 bits as defined in section 7.1.7 of *E-UTRA, Physical Layer Procedures*.
  New data indicator—1 bit.
  Redundancy version—2 bits.
  If both transport blocks are enabled, the number of layers equals two; transport block 1 is mapped to codeword 0; and transport block 2 is mapped to codeword 1. Antenna ports 7, 8, 9, 10, 11, 12, 13 and 14 are used for spatial multiplexing.
  In case one of the transport blocks is disabled, the number of layers equals one; the transport block to codeword mapping is specified according to Table 19; and antenna port indices for transmission are determined by another table, called antenna port mapping table, and some example tables will be described here below.

TABLE 19

Transport block to codeword mapping (one transport block enabled).

| transport block 1 | transport block 2 | codeword 0 (enabled) | codeword 1 (disabled) |
|---|---|---|---|
| enabled | disabled | transport block 1 | — |
| disabled | enabled | transport block 2 | — |

If the number of information bits in format 2B belongs to one of the sizes in Table 5.3.3.1.2-1 in *E-UTRA, Physical Layer Procedures*, one zero bit shall be appended to format 2B.

In some embodiments, the N4 number of bits assigned for the N4-bit information element 1405 of antenna port indication is at least partially determined by one of number of transmit antennas at BS 102 and number of receive antennas at SS 116.

In one example, N4 is determined by number of transmit antennas at BS 102 as shown in Tables 20 and 21.

TABLE 20

An example for the N4 numbers

| Number of Tx antennas | N4 |
|---|---|
| 2 | 1 |
| 4 | 2 |
| 8 | 3 |

TABLE 21

An example for the N4 numbers

| Number of Tx antennas | N4 |
|---|---|
| 2 | 1 |
| 4 | 3 |
| 8 | 4 |

In another example, N4 is determined by a minimum between two numbers: one number is the number of transmit (Tx) antennas at BS 102, while the other number is the number of receive (Rx) antennas at SS 116, as shown in Tables 22 and 23.

TABLE 22

An example for the N4 numbers

| min(number of Tx antennas, number of Rx antennas) | N4 |
|---|---|
| 2 | 1 |
| 4 | 2 |
| 8 | 3 |

TABLE 23

An example for the N4 numbers

| min(number of Tx antennas, number of Rx antennas) | N4 |
|---|---|
| 2 | 1 |
| 4 | 3 |
| 8 | 4 |

In some embodiments, one out of the states listed below can be conveyed in DCI format 2C 1100 or DCI format 2C 1400, by means of selecting a codepoint formed by at least one of N4-bit or N3-bit antenna port indication and an NDI bit of an unused transport block (TB), if any. In Table 24, a state is associated with at least one of a selected DM RS pattern, AP indices within the selected DM RS pattern, a scrambling id (SC-ID), whether the transmission is a new transmission or a HARQ re-transmission (New transmit/Retransmit), and number of TBs transmitted in the transmission (#TBs).

Some of information represented by the table entries are:

Each entry in the DM RS pattern column represents a DM RS pattern indicated by the DCI 1100, 1400, where Rank-2 400, 405, Rank-4 420 and Rank-8 440, 450 patterns are defined in FIGS. 4A through 4E.

Each entry in the port indices column represents AP indices indicated by the DCI 1100, 1400, where the numbers represent respective APs defined in LTE-Advanced standard.

When number of port indices indicated by the DCI 1100, 1400 is greater than 2, multiple choices may exist for the port indices. Some examples are shown in Table 25.

Entries in a column labeled with Example 1 are selected such that a top CDM set (that is, DM RS REs labeled with K in FIG. 4E) include DM RS for a larger number of APs than the bottom CDM set (that is, DM RS REs labeled with L in FIG. 4E); and at the same time, DM RS for layers from a same codeword are mapped to one CDM set.

Entries in a column labeled with Example 2 are selected such that DM RS for layers 0 through 7 are sequentially mapped to DM RS REs for APs 7 through 14, in a one-to-one manner: i.e., layer 0==>AP7, layer 1==>AP8, . . . , layer 7==>AP 14.

For initial transmission AP index sets (New-TX or Re-TX), entries in a column labeled with Example 3 are selected in either of the two methods used in Example 1 and Example 2. Alternatively, for retransmission AP index sets (Set_R3_re and Set_R4_re), are composed of DM RS AP indices corresponding to the top CDM set.

Each entry in the SCID column represents a scrambling id indicated by the DCI 1100, 1400, where the numbers represent respective scrambling ids defined in 3GPP TS 36.212 v 9.0.0, "*E-UTRA, Multiplexing and Channel coding*", December 2009, the contents of which are incorporated by reference in its entirety.

TABLE 24

List of states indicated by at least one of N4-bit (or N3 bit)antenna port indication and an NDI bit of an unused TB.

| State number | DM RS pattern | Port indices | SCID | New-Tx/Re-Tx | # TBs |
|---|---|---|---|---|---|
| 0 | Rank-2 | 7 | 0 | New- or Re- | One TB |
| 1 | Rank-2 | 7 | 1 | New- or Re- | One TB |
| 2 | Rank-2 | 8 | 0 | New- or Re- | One TB |
| 3 | Rank-2 | 8 | 1 | New- or Re- | One TB |
| 4 | Rank-2 | 7, 8 | 0 | New- or Re- | Two TBs |
| 5 | Rank-2 | 7, 8 | 1 | New- or Re- | Two TBs |
| 6 | Rank-2 | 7, 8 | 0 | Re-Tx | One TB |
| 7 | Rank-2 | 7, 8 | 1 | Re-Tx | One TB |
| 8 | Rank-4 | 7 | 0 | New- or Re- | One TB |
| 9 | Rank-4 | 8 | 0 | New- or Re- | One TB |
| 10 | Rank-4 | 9 | 0 | New- or Re- | One TB |
| 11 | Rank-4 | 10 | 0 | New- or Re- | One TB |
| 12 | Rank-4 | 7, 8 | 0 | New- or Re- | Two TBs |
| 13 | Rank-4 | 7, 8 | 0 | Re-Tx | One TB |
| 14 | Rank-4 | 9, 10 | 0 | New- or Re- | Two TBs |
| 15 | Rank-4 | 9, 10 | 0 | Re-Tx | One TB |
| 16 | Rank-4 | Set_R3_new | 0 | New- or Re- | Two TBs |
| 17 | Rank-4 | Set_R3_re | 0 | Re-Tx | One TB |
| 18 | Rank-4 | Set_R4_new | 0 | New- or Re- | Two TBs |
| 19 | Rank-4 | Set_R4_re | 0 | Re-Tx | One TB |
| 20 | Rank-8 | Set_R5 | 0 | New- or Re- | Two TBs |
| 21 | Rank-8 | Set_R6 | 0 | New- or Re- | Two TBs |
| 22 | Rank-8 | Set_R7 | 0 | New- or Re- | Two TBs |
| 23 | Rank-8 | Set_R8 | 0 | New- or Re- | Two TBs |

TABLE 25

Examples of AP numbers conveyed by the DCI format for higher ranks (number of APs > 2)

| Set | Example 1 | Example 2 | Example 3 | Remark |
|---|---|---|---|---|
| Set_R3_new | {7, 9, 10} | {7, 8, 9} | {7, 9, 10} or {7, 8, 9} | Rank-3 indication for New-Tx |
| Set_R3_re | {7, 9, 10} | {7, 8, 9} | {7, 8, 11} | Rank-3 indication for Re-Tx |
| Set_R4_new | {7, 8, 9, 10} | {7, 8, 9, 10} | {7, 8, 9, 10} | Rank-4 indication for New-Tx |
| Set_R4_re | {7, 8, 9, 10} | {7, 8, 9, 10} | {7, 8, 11, 13} | Rank-4 indication for Re-Tx |
| Set_R5 | {7, 8, 9, 10, 12} | {7, 8, 9, 10, 11} | {7, 8, 9, 10, 12} or {7, 8, 9, 10, 11} | Rank-5 indication |
| Set_R6 | {7, 8, 9, 10, 11, 12} | {7, 8, 9, 10, 11, 12} | {7, 8, 9, 10, 11, 12} | Rank-6 indication |
| Set_R7 | {7, 8, 9, 10, 11, 12, 14} | {7, 8, 9, 10, 11, 12, 13} | {7, 8, 9, 10, 11, 12, 14} or {7, 8, 9, 10, 11, 12, 13} | Rank-7 indication |
| Set_R8 | {7, 8, 9, 10, 11, 12, 13, 14} | {7, 8, 9, 10, 11, 12, 13, 14} | {7, 8, 9, 10, 11, 12, 13, 14} | Rank-8 indication |

State Indication Example 1

DCI Format 2C for 8-Tx eNodeBs, where Rank-4 Pattern is Used Only for SU-MIMO for Rank>=3 (i.e., MU-MIMO Indication Method 2 in the Background Section)

When the Rank-4 DM RS pattern 420 is used only for SU-MIMO for rank>=3, the DCI 1100, 1400 does not indicate states associated with less than 3 AP indices in the Rank-4 DM RS pattern 420. Eight such states exist in Table 24, which are 8, 9, . . . , 15. Removing these 8 states, the total number of states becomes 16. Depending upon whether the number of TBs enabled is one or two, codepoints in DCI format 2C 1100, 1400 convey the states related to DM RS port information as in Tables 26 and 27.

Embodiments of the present disclosure combine the new 3-bit field (AP indication) in DCI format 2C 1100, 1400 (the N3-1115 or the N4-bit field 1405), and the codepoints in the DCI format 1100, 1400 to differentiate the cases of one TB enabled and two TBs enabled, in order to indicate the complete table of DMRS ports, DMRS pattern and scrambling ID for the associated DMRS. If the number of enabled TB is one, then this 3-bit field 1115 can be combined with the NDI bit of the disabled TB to form a 4-bit field 1405. Either this 3-bit field 1115 or the combined 4-bit field 1405 is used to indicate one state out of 8 states shown in Table 26. If the number of enabled TBs is two, then this 3-bit field is used to indicate the state table shown in Table 27.

TABLE 26

Antenna port mapping table example 1, when only one TB is enabled.

| Bit field mapped to index | DMRS pattern | Port indices | SCID | RE-/New- Tx (Informative) | Indicated State # from Table 24 (Informative) |
|---|---|---|---|---|---|
| 0 | Rank-2 | 7 | 0 | New- or Re- | 0 |
| 1 | Rank-2 | 7 | 1 | New- or Re- | 1 |
| 2 | Rank-2 | 8 | 0 | New- or Re- | 2 |
| 3 | Rank-2 | 8 | 1 | New- or Re- | 3 |
| 4 | Rank-2 | 7, 8 | 0 | Re-Tx | 6 |
| 5 | Rank-2 | 7, 8 | 1 | Re-Tx | 7 |
| 6 | Rank-4 | 7, 8, 9 | 0 | Re-Tx | 17 |
| 7 | Rank-4 | 7, 8, 9, 10 | 0 | Re-Tx | 19 |
| 8 | Reserved | Reserved | Reserved | Reserved | Reserved |
| 9 | Reserved | Reserved | Reserved | Reserved | Reserved |
| 10 | Reserved | Reserved | Reserved | Reserved | Reserved |
| 11 | Reserved | Reserved | Reserved | Reserved | Reserved |
| 12 | Reserved | Reserved | Reserved | Reserved | Reserved |
| 13 | Reserved | Reserved | Reserved | Reserved | Reserved |
| 14 | Reserved | Reserved | Reserved | Reserved | Reserved |
| 15 | Reserved | Reserved | Reserved | Reserved | Reserved |

TABLE 27

Antenna port mapping table example 1, when only one TB is enabled.

| Bit field mapped to index | DMRS pattern | Port indices | SCID | Indicated State # from Table 24 (Informative) |
|---|---|---|---|---|
| 0 | Rank-2 | 7, 8 | 0 | 4 |
| 1 | Rank-2 | 7, 8 | 1 | 5 |
| 2 | Rank-4 | 7, 8, 9 | 0 | 16 |
| 3 | Rank-4 | 7, 8, 9, 10 | 0 | 18 |
| 4 | Rank-8 | 7, 8, 9, 10, 11 | 0 | 20 |
| 5 | Rank-8 | 7, 8, 9, 10, 11, 12 | 0 | 21 |
| 6 | Rank-8 | 7, 8, 9, 10, 11, 12, 10 | 0 | 22 |
| 7 | Rank-8 | 7, 8, 9, 10, 11, 12, 13, 14 | 0 | 23 |

State Indication Example 2

DCI Format 2C for 4-Tx eNodeBs, where Rank-4 Pattern is Used Only for SU-MIMO for Rank>=3 (i.e., MU-MIMO Indication Method 2 in the Background Section)

Four states (States 20, 21, 22, 23) from the states in Table 24 associated with Rank 8 pattern are further reduced as well as the eight states removed in State indication example 1; then the total number of states becomes 12. Depending upon whether the number of TBs enabled is one or two, codepoints in DCI format 2C 1100, 1400 conveys the states related to DM RS port information as in Tables 28 and 29.

Embodiments of the present disclosure combine the new 2-bit field (AP indication) in DCI format 2C 1100, 1400 (the N3-1115 or the N4-bit field 1405), and the codepoints in the DCI format 1100, 1400 to differentiate the cases of one TB enabled and two TBs enabled, in order to indicate the complete table of DMRS ports, DMRS pattern and scrambling ID for the associated DMRS. If the number of enabled TB is one, then this 2-bit field can be combined with the NDI bit of the disabled TB to form a 3-bit field 1405. The combined 3-bit field 1405 is used to indicate one state out of 6 states shown in Table 28. If the number of enabled TBs is two, then this 2-bit field 1115 is used to indicate the state table shown in Table 29.

TABLE 29

Antenna port mapping table example 2, when two TBs are enabled.

| Bit field mapped to index | DMRS pattern | Port indices | SCID | Indicated State # from Table 24 |
|---|---|---|---|---|
| 0 | Rank-2 | 7, 8 | 0 | 4 |
| 1 | Rank-2 | 7, 8 | 1 | 5 |
| 2 | Rank-4 | 7, 8, 9 | 0 | 16 |
| 3 | Rank-4 | 1, 8, 9, 10 | 0 | 18 |

State Indication Example 3

DCI Format 2c for 8-Tx eNodeBs, where Rank-4 Pattern is Used for Both SU- and MU-MIMO (i.e., MU-MIMO Indication Method 1 in the Background Section)

When the Rank-4 DM RS pattern 420 is used only for both SU- and MU-MIMO, all states can be indicated in Table 24 using codepoints in DCI format 2C 1100, 1400.

As seen in Table 14, 14 states associated with one TB exist, while 10 states associated with two TBs exist.

In the example where a new 4-bit field (AP indication) is added to the DCI format 2B 1000 to construct DCI format 2C 1100, 1400 (that is, we add the N3-1115 or the N4-bit field 1405), in both cases of one TB and two TB enabled, the 16 codepoints generated by the 4-bit field are sufficient to indicate all the associated states: 14 states if one TB enabled, 10 states if two states enabled.

In some embodiments, the new 4-bit field (AP indication) in DCI format 2C 1100, 1400 (the N3-1115 or the N4-bit field 1405), is combined with the codepoints in the DCI format 1100, 1400 to differentiate the cases of one TB enabled and two TBs enabled, in order to indicate the complete table of DMRS ports, DMRS pattern and scrambling ID for the associated DMRS. If the number of enabled TB is one, then this 4-bit field can be combined with the NDI bit of the disabled TB to form a 5-bit field. Either this 4-bit field or the combined 5-bit field is used to indicate one state out of 14 states shown in Table 30. If the number of enabled TB is two, then this 4-bit field is used to indicate the state table shown in Table 31.

TABLE 28

Antenna port mapping table example 2, when only one TB is enabled.

| Bit field mapped to index | DMRS pattern | Port indices | SCID | RE/New Tx (Informative) | Indicated State # from Table 24 (Informative) |
|---|---|---|---|---|---|
| 0 | Rank-2 | 7 | 0 | New- or Re- | 0 |
| 1 | Rank-2 | 7 | 1 | New- or Re- | 1 |
| 2 | Rank-2 | 8 | 0 | New- or Re- | 2 |
| 3 | Rank-2 | 8 | 1 | New- or Re- | 3 |
| 4 | Rank-2 | 7, 8 | 0 | Re-Tx | 6 |
| 5 | Rank-2 | 7, 8 | 1 | Re-Tx | 7 |
| 6 | Reserved | Reserved | Reserved | Reserved | Reserved |
| 7 | Reserved | Reserved | Reserved | Reserved | Reserved |

TABLE 30

State indication in DCI format 2C when only one TB is enabled.

| Bit field mapped to index | DMRS pattern | Port indices | SCID | RE/New Tx (Informative) | Indicated State # from Table 24 (Informative) |
|---|---|---|---|---|---|
| 0 | Rank-2 | 7 | 0 | New- or Re- | 0 |
| 1 | Rank-2 | 7 | 1 | New- or Re- | 1 |
| 2 | Rank-2 | 8 | 0 | New- or Re- | 2 |
| 3 | Rank-2 | 8 | 1 | New- or Re- | 3 |
| 4 | Rank-2 | 7, 8 | 0 | Re-Tx | 6 |
| 5 | Rank-2 | 7, 8 | 1 | Re-Tx | 7 |
| 6 | Rank-4 | 7 | 0 | New- or Re- | 8 |
| 7 | Rank-4 | 8 | 0 | New- or Re- | 9 |
| 8 | Rank-4 | 9 | 0 | New- or Re- | 10 |
| 9 | Rank-4 | 10 | 0 | New- or Re- | 11 |
| 10 | Rank-4 | 7, 8 | 0 | Re-Tx | 13 |
| 11 | Rank-4 | 9, 10 | 0 | Re-Tx | 15 |
| 12 | Rank-4 | Set_R3_re | 0 | Re-Tx | 17 |
| 13 | Rank-4 | Set_R4_re | 0 | Re-Tx | 19 |
| 14 | Reserved | Reserved | Reserved | Reserved | Reserved |
| 15 | Reserved | Reserved | Reserved | Reserved | Reserved |

TABLE 31

State indication in DCI format 2C when both TB are enabled

| Bit field mapped to index | DMRS pattern | Port indices | SCID | Indicated State # from Table 24 (Informative) |
|---|---|---|---|---|
| 0 | Rank-2 | 7, 8 | 0 | 4 |
| 1 | Rank-2 | 7, 8 | 1 | 5 |
| 2 | Rank-4 | 7, 8 | 0 | 12 |
| 3 | Rank-4 | 9, 10 | 0 | 14 |
| 4 | Rank-4 | Set_R3_new | 0 | 16 |
| 5 | Rank-4 | Set_R4_new | 0 | 18 |
| 6 | Rank-8 | Set_R5 | 0 | 20 |
| 7 | Rank-8 | Set_R6 | 0 | 21 |
| 8 | Rank-8 | Set_R7 | 0 | 22 |
| 9 | Rank-8 | Set_R8 | 0 | 23 |
| 10 | reserved | reserved | reserved | reserved |
| 11 | reserved | reserved | reserved | reserved |
| 12 | reserved | reserved | reserved | reserved |
| 13 | reserved | reserved | reserved | reserved |
| 14 | reserved | reserved | reserved | reserved |
| 15 | reserved | reserved | reserved | reserved |

In the example in which a new 3-bit field (AP indication) is added to DCI format 2B 1000 to construct DCI format 2C 1100, 1400 (i.e., we add the N3-1115 or the N4-bit field 1405).

When only one TB is enabled, an NDI bit of a disabled TB and the new 3-bit field can generate 16 codepoints, which are sufficient to indicate the 14 states associated with one TB.

However, when both TBs are enabled, the 3-bit field generates only 8 codepoints, which is not sufficient for indicating 10 states associated with 2 TBs. Therefore, 8 states are down-selected out of the 10 states. For this purpose, two rank-2 states (or states associated with indicating two AP indices) are removed from the 10 states. The rank-2 states associated with 2 TBs are: States 4, 5, 12 and 14. State 5 having SCID=1 can be removed since up to 4 UEs can be multiplexed with providing 4 orthogonal DM RS in Rank-4 pattern 420 instead of relying on quasi-orthogonal multiplexing method utilizing SCID. State 14 is retained, as it is the only state that indicates APs 9 and 10. Then, either State 4 or state 12 can be chosen.

Then, in some embodiments the new 3-bit field (AP indication) in DCI format 2C 1100, 1400 (the N3-1115 or the N4-bit 1405) is combined with the codepoints in the DCI format to differentiate the cases of one TB enabled and two TBs enabled, in order to indicate the complete table of DMRS ports, DMRS pattern and scrambling ID for the associated DMRS. If the number of enabled TB is one, then this 3-bit field can be combined with the NDI bit of the disabled TB to form a 4-bit field. The combined 0-bit field is used to indicate one state out of 14 states shown in Table 30. If the number of enabled TB is two, then this 3-bit field is used to indicate the state table shown in Table 32.

TABLE 32

State indication in DCI format 2C for 4-Tx eNodeBs, where Rank-4 Pattern is used for both SU-and MU-MIMO

| Bit field mapped to index | DMRS pattern | Port indices | SCID | Indicated State # from Table 24 (Informative) |
|---|---|---|---|---|
| 0 | Rank-2 (or Rank-4) | 7, 8 | 0 | 4 (or 12) |
| 1 | Rank-4 | 9, 10 | 0 | 14 |
| 2 | Rank-4 | Set_R3 new | 0 | 16 |
| 3 | Rank-4 | Set_R4 new | 0 | 18 |
| 4 | Rank-8 | Set_R5 | 0 | 20 |
| 5 | Rank-8 | Set_R6 | 0 | 21 |
| 6 | Rank-8 | Set_R7 | 0 | 22 |
| 7 | Rank-8 | Set_R8 | 0 | 23 |

State Indication Example 4

DCI Format 2C for 4-Tx eNodeBs, where Rank-4 Pattern is Used for Both SU- and MU-MIMO (i.e., MU-MIMO Indication Method 1 in the Background Section)

Four states (States 20, 21, 22, 23) can be reduced from the states in Table 24 associated with Rank 8 pattern. As seen in Table 24, there are 14 states associated with one TB, while 6 states associated with two TBs exist.

In one example, a new 3-bit field (AP indication) is added to DCI format 2B 1000 to construct DCI format 2C 1100, 1400 (that is, the N3-1115 or the N4-bit field 1405 is added).

When only one TB is enabled, an NDI bit of a disabled TB and the new 3-bit field can generate 16 codepoints, which are sufficient to indicate the 14 states associated with one TB.

When two TBs are enabled, the 8 codepoints generated by the 3-bit field are sufficient to indicate all the 6 associated states.

In some embodiments, the new 3-bit field (AP indication) in DCI format 2C 1100, 1400 is combined with the codepoints in the DCI format to differentiate the cases of one TB enabled and two TBs enabled, in order to indicate the complete table of DMRS ports, DMRS pattern and scrambling ID for the associated DMRS. If the number of enabled TB is one, then this 3-bit field can be combined with the NDI bit of the disabled TB to form a 4-bit field. The combined 4-bit field is used to indicate one state out of 14 states shown in Table 30. If the number of enabled TB is two, then this 3-bit field is used to indicate the state table shown in Table 33.

TABLE 33

State indication in DCI format 2C when both TB are enabled

| Bit field mapped to index | DMRS pattern | Port indices | SCID | Indicated State # from Table 24 (Informative) |
|---|---|---|---|---|
| 0 | Rank-2 | 7, 8 | 0 | 4 |
| 1 | Rank-2 | 7, 8 | 1 | 5 |
| 2 | Rank-4 | 7, 8 | 0 | 12 |
| 3 | Rank-4 | 9, 10 | 0 | 14 |
| 4 | Rank-4 | Set_R3_new | 0 | 16 |
| 5 | Rank-4 | Set_R4_new | 0 | 18 |
| 6 | reserved | reserved | reserved | reserved |
| 7 | reserved | reserved | reserved | reserved |

In some embodiments a new 2-bit field (AP indication) is added to DCI format 2B 1000 to construct DCI format 2C 1100, 1400 (that is, the N3-1115 or the N4-bit field 1405 is added).

In case where only one TB is enabled, an NDI bit of a disabled TB and the 2-bit field generate only 8 codepoints, which is not sufficient to indicate the 14 states associated with one TB. Therefore eight states are down-selected out of the fourteen states. Three states with SCID=1 (States 1, 3, 7) are removed since up to 4 UEs can be multiplexed with providing 4 orthogonal DM RS in Rank-4 pattern 420 instead of relying on quasi-orthogonal multiplexing method utilizing SCID. Then, retransmission states associated with rank 3 and rank 4 are removed, which are States 17 and 19, no cases exist where a retransmission for a TB uses more than 2 layers in 4-Tx eNodeB in LTE-Advanced. Finally, one state out of 3 rank-2 states, which are States 6, 13 and 15, is removed.

However, when both TBs are enabled, the 2-bit field generates only 4 codepoints, which is not sufficient for indicating 6 states associated with 2 TBs. Therefore, four states are down-selected out of the six states. The same down-selection method used for 2-TB case of State indication example 3 can be used to down-select the four states.

In some embodiments, the new 2-bit field (AP indication) in DCI format 2C 1100, 1400 (that is, the N3-1115 or the N4-bit field 1405) is combined with the codepoints in the DCI format to differentiate the cases of one TB enabled and two TBs enabled, in order to indicate the complete table of DMRS ports, DMRS pattern and scrambling ID for the associated DMRS. If the number of enabled TB is one, then this 2-bit field can be combined with the NDI bit of the disabled TB to form a 3-bit field. The combined 3-bit field is used to indicate one state out of six states shown in Table 34. If the number of enabled TB is two, then this 2-bit field is used to indicate the state table shown in Table 35.

TABLE 34

State indication in DCI format 2C when only one TB is enabled

| Bit field mapped to index | DMRS pattern | Port indices | SCID | RE/New Tx (Informative) | Indicated State # from Table 24 (Informative) |
|---|---|---|---|---|---|
| 0 | Rank-2 | 7 | 0 | New- or Re- | 0 |
| 1 | Rank-2 | 8 | 0 | New- or Re- | 2 |
| 2 | Rank-2 | 7, 8 | 0 | Re-Tx | 6 |
| 3 | Rank-4 | 7 | 0 | New- or Re- | 8 |
| 4 | Rank-4 | 8 | 0 | New- or Re- | 9 |
| 5 | Rank-4 | 9 | 0 | New- or Re- | 10 |
| 6 | Rank-4 | 10 | 0 | New- or Re- | 11 |
| 7 | Rank-4 | 7, 8 | 0 | Re-Tx | 13 |

TABLE 35

State indication in DCI format 2C when both TBs are enabled

| Bit field mapped to index | DMRS pattern | Port indices | SCID | Indicated State # from Table 24 |
|---|---|---|---|---|
| 0 | Rank-2 (or Rank-4) | 7, 8 | 0 | 4 (or 12) |
| 1 | Rank-4 | 9, 10 | 0 | 14 |
| 2 | Rank-4 | Set_R3_new | 0 | 16 |
| 3 | Rank-4 | Set_R4_new | 0 | 18 |

In some embodiments, a layer-to-DM RS port mapping for rank 1 and rank 2 when Rank-4 pattern is used for both SU- and MU-MIMO that is, MU-MIMO indication method 1 in the background section is used) is defined in such a way that:

When rank 1 is indicated, the DM RS for the one layer (denoted by layer 0, or L0) is mapped to DM RS REs for an indicated antenna port by DCI format 2C 1100, 1400.

When rank 2 is indicated, the DM RS for the two layers (denoted by layers 0 and 1, or L0 and L1) are mapped to DM RS REs for two indicated antenna ports by DCI format 2C, 1100, 1400.

An example layer-to-DM RS mapping table for rank 1 and rank 2 is constructed as in Table 36.

TABLE 36

A Proposed Layer to DM RS port mapping for rank 1 and rank 2, when Rank-4 pattern is used for both SU- and MU-MIMO (i.e., MU-MIMO indication method 1 in the background section is used)

| Transmission Rank | Indicated DM RS Port Indices | Layer to DMRS port mapping (L0: layer 0, L1: layer 1) |
|---|---|---|
| 1 | 7 | L0 on antenna port 7 |
| 1 | 8 | L0 on antenna port 8 |
| 1 | 9 | L0 on antenna port 9 |
| 1 | 10 | L0 on antenna port 10 |
| 2 | 7, 8 | L0 on antenna port 7, and L1 on antenna port 8 |
| 2 | 9, 10 | L0 on antenna port 9, and L1 on antenna port 10 |

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for communicating with a plurality of subscriber stations, the method comprising:

transmitting a downlink grant downlink control information (DCI) format and data in a subframe from a base station to at least one of the plurality of subscriber stations, wherein the downlink grant DCI format is configured to schedule a Physical Downlink Shared CHannel (PDSCH) with one or two enabled codewords, wherein the downlink grant DCI format comprises a 3-bit field indicating at least a number of antenna ports for the PDSCH, a corresponding set of indices for the antenna ports, and a scrambling identifier (ID), and wherein, when the PDSCH is scheduled with two enabled codewords, a state of the 3-bit field indicates the number of antenna ports as follows:

| State of the 3-bit field | Number |
| --- | --- |
| 2 | 3 |
| 3 | 4 |
| 4 | 5 |
| 5 | 6 |
| 6 | 7 |
| 7 | 8. |

2. The method as set forth in claim 1, wherein, when the PDSCH is scheduled with two enabled codewords, the state of the 3-bit field further indicates the number of antenna ports as follows:

| State of the 3-bit field | Number |
| --- | --- |
| 0 | 2 |
| 1 | 2. |

3. The method as set forth in claim 1, wherein, when the PDSCH is scheduled with one enabled codeword, the state of the 3-bit field indicates the antenna port indices and the scrambling ID as follows:

| State of the 3-bit field | Antenna Port Indices | Scrambling ID |
| --- | --- | --- |
| 0 | 7 | 0 |
| 1 | 7 | 1 |
| 2 | 8 | 0 |
| 3 | 8 | 1. |

4. A base station, comprising:
a transmitter configured to transmit a downlink grant downlink control information (DCI) format and data in a subframe to at least one of a plurality of subscriber stations, wherein the downlink grant DCI format is configured to schedule a Physical Downlink Shared CHannel (PDSCH) with one or two enabled codewords, wherein the downlink grant DCI format comprises a 3-bit field indicating at least a number of antenna ports for the PDSCH, a corresponding set of indices for the antenna ports, and a scrambling identifier (ID), and wherein, when the PDSCH is scheduled with two enabled codewords, a state of the 3-bit field indicates the number of antenna ports as follows:

| State of the 3-bit field | Number |
| --- | --- |
| 2 | 3 |
| 3 | 4 |
| 4 | 5 |
| 5 | 6 |
| 6 | 7 |
| 7 | 8. |

5. The base station as set forth in claim 4, wherein, when the PDSCH is scheduled with two enabled codewords, the state of the 3-bit field further indicates the number of antenna ports as follows:

| State of the 3-bit field | Number |
| --- | --- |
| 0 | 2 |
| 1 | 2. |

6. The base station as set forth in claim 4, wherein, when the PDSCH is scheduled with one enabled codeword, the state of the 3-bit field indicates the antenna port indices and the scrambling ID as follows:

| State of the 3-bit field | Antenna Port Indices | Scrambling ID |
| --- | --- | --- |
| 0 | 7 | 0 |
| 1 | 7 | 1 |
| 2 | 8 | 0 |
| 3 | 8 | 1. |

7. A method for communicating with a base station, the method comprising:
receiving a downlink grant downlink control information (DCI) format and data in a subframe at a subscriber station from a base station, wherein the downlink grant DCI format is configured to schedule a Physical Downlink Shared CHannel (PDSCH) with one or two enabled codewords, wherein the downlink grant DCI format comprises a 3-bit field indicating at least a number of antenna ports for the PDSCH, a corresponding set of indices for the antenna ports, and a scrambling identifier (ID), and wherein, when the PDSCH is scheduled with two enabled codewords, a state of the 3-bit field indicates the number of antenna ports as follows:

| State of the 3-bit field | Number |
| --- | --- |
| 2 | 3 |
| 3 | 4 |
| 4 | 5 |
| 5 | 6 |
| 6 | 7 |
| 7 | 8. |

8. The method as set forth in claim 7, wherein, when the PDSCH is scheduled with two enabled codewords, the state of the 3-bit field further indicates the number of antenna ports as follows:

| State of the 3-bit field | Number |
| --- | --- |
| 0 | 2 |
| 1 | 2. |

9. The method as set forth in claim 7, wherein, when the PDSCH is scheduled with one enabled codeword, the state of the 3-bit field indicates the antenna port indices and the scrambling ID as follows:

| State of the 3-bit field | Antenna Port Indices | Scrambling ID |
|---|---|---|
| 0 | 7 | 0 |
| 1 | 7 | 1 |
| 2 | 8 | 0 |
| 3 | 8 | 1. |

10. A subscriber station, comprising:
a receiver configured to receive a downlink grant downlink control information (DCI) format and data in a subframe from a base station,
wherein the downlink grant DCI format is configured to schedule a Physical Downlink Shared CHannel (PDSCH) with one or two enabled codewords,
wherein the downlink grant DCI format comprises a 3-bit field indicating at least a number of antenna ports for the PDSCH, a corresponding set of indices for the antenna ports, and a scrambling identifier (ID), and
wherein, when the PDSCH is scheduled with two enabled codewords, the state of the 3-bit field indicates the number of antenna ports as follows:

| State of the 3-bit field | Number |
|---|---|
| 2 | 3 |
| 3 | 4 |
| 4 | 5 |
| 5 | 6 |
| 6 | 7 |
| 7 | 8. |

11. The subscriber station as set forth in claim 10, wherein, when the PDSCH is scheduled with two enabled codewords, the state of the 3-bit field further indicates the number of antenna ports as follows:

| State of the 3-bit field | Number |
|---|---|
| 0 | 2 |
| 1 | 2. |

12. The subscriber station as set forth in claim 10, wherein, when the PDSCH is scheduled with one enabled codeword, the state of the 3-bit field indicates the antenna port indices and the scrambling ID as follows:

| State of the 3-bit field | Antenna Port Indices | Scrambling ID |
|---|---|---|
| 0 | 7 | 0 |
| 1 | 7 | 1 |
| 2 | 8 | 0 |
| 3 | 8 | 1. |

* * * * *